(12) United States Patent
Takada et al.

(10) Patent No.: US 10,185,067 B2
(45) Date of Patent: Jan. 22, 2019

(54) METHOD OF MANUFACTURING POLARIZING PLATE

(71) Applicant: DEXERIALS CORPORATION, Tokyo (JP)

(72) Inventors: Akio Takada, Miyagi (JP); Eiji Takahashi, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/613,824

(22) Filed: Jun. 5, 2017

(65) Prior Publication Data

US 2017/0269275 A1    Sep. 21, 2017

Related U.S. Application Data

(62) Division of application No. 14/317,232, filed on Jun. 27, 2014, now Pat. No. 9,703,026.

(30) Foreign Application Priority Data

Jul. 10, 2013  (JP) ................................. 2013-145034
Sep. 17, 2013  (JP) ................................. 2013-191345

(51) Int. Cl.
    *G02B 5/30*  (2006.01)
(52) U.S. Cl.
    CPC ................................. *G02B 5/3058* (2013.01)
(58) Field of Classification Search
    CPC ... G02B 5/1809; G02B 5/1861; G02B 5/3058
    (Continued)

(56) References Cited

U.S. PATENT DOCUMENTS 6,772,608 B1  8/2004 Drost et al.
9,360,608 B2  6/2016 Takahashi et al.
(Continued)

FOREIGN PATENT DOCUMENTS

JP  2000-147253 A  5/2000
JP  2002-372620 A  12/2002
(Continued)

OTHER PUBLICATIONS

Oct. 28, 2016 Office Action issued in Japanese Patent Application No. 2013-191345.

*Primary Examiner* — Arnel C Lavarias
(74) *Attorney, Agent, or Firm* — Oliff PLC

(57) ABSTRACT

A polarizing plate having an excellent optical property and a method of manufacturing the same. The polarizing plate includes: a transparent substrate transmitting light in a used bandwidth; an absorbing layer having at least a metal-containing semiconductor layer containing a metal, the absorbing layer being arranged as a one-dimensional lattice shaped wire-grid structure having a pitch smaller than the wavelength of the light in the used bandwidth; a dielectric layer arranged as a one-dimensional lattice shaped wire-grid structure having a pitch smaller than the wavelength of light in the used bandwidth; and a reflective layer arranged as a one-dimensional lattice shaped wire-grid structure having a pitch smaller than the wavelength of light in the used bandwidth, wherein the absorbing layer, the dielectric layer and the reflective layer are layered on the transparent substrate in this or reversed order.

20 Claims, 36 Drawing Sheets

(58) Field of Classification Search
USPC ......... 359/485.05, 487.03, 489.06, 566, 569, 359/572, 576; 362/19; 353/20
See application file for complete search history.

(56) References Cited

U.S. PATENT DOCUMENTS

| | | | |
|---|---|---|---|
| 9,703,026 B2* | 7/2017 | Takada | G02B 5/3058 |
| 2013/0286358 A1 | 10/2013 | Takahashi et al. | |

FOREIGN PATENT DOCUMENTS

| | | |
|---|---|---|
| JP | 2008-216957 A | 9/2008 |
| JP | 2010-530994 A | 9/2010 |
| JP | 2012-181420 A | 9/2012 |
| WO | 12/118204 A1 | 9/2012 |

* cited by examiner

| composition | Rate(nm/sec) |
|---|---|
| Fe(5%)Si(95%) | 0.973 |
| Fe(10%)Si(90%) | 0.234 |
| Fe(15%)Si(85%) | not etched |

FIG.13B optical properties in R, G and B

| wavelength range | Tp | Ts | CR | Rp | Rs |
|---|---|---|---|---|---|
| B: 430–510 [nm] | 73.2 | 0.117 | 625 | 1.0 | 5.9 |
| G: 520–590 [nm] | 78.0 | 0.071 | 1106 | 0.9 | 4.5 |
| R: 600–680 [nm] | 82.3 | 0.051 | 1606 | 0.7 | 5.0 |

FIG.32B optical properties in R,G and B

| wavelength range | Tp | Ts | CR | Rp | Rs |
|---|---|---|---|---|---|
| B: 430-510 [nm] | 77.3 | 0.139 | 558 | 0.5 | 0.8 |
| G: 520-590 [nm] | 81.3 | 0.086 | 947 | 0.9 | 0.9 |
| R: 600-680 [nm] | 84.0 | 0.062 | 1348 | 1.3 | 3.7 |

FIG.35B

METHOD OF MANUFACTURING POLARIZING PLATE

This application is a Divisional of application Ser. No. 14/317,232, filed Jun. 27, 2014, which claims priority to Japanese Application No. 2013-191345, filed Sep. 17, 2013, and Japanese Application No. 2013-145034, filed Jul. 10, 2013. The entire contents of the prior applications are hereby incorporated by reference herein in their entireties.

BACKGROUND OF THE INVENTION

1. Field of the Invention

This invention relates to a polarizing plate for absorbing one of mutually orthogonal polarized components (P-polarized wave and S-polarized wave) and transmitting the other, and a method for manufacturing the same.

2. Description of the Related Art

The image formation principle of liquid crystal display devices essentially requires a polarizing plate provided on a surface of a liquid crystal panel. The function of the polarizing plate is to absorb one of mutually orthogonal polarized components (P-polarized wave and S-polarized wave) and to transmit the other.

Dichroic polarizing plates containing iodine or dye type organic polymer materials in films have been widely used as this kind of polarizing plate. These polarizing plates are generally manufactured by using a method including steps of dyeing a polyvinyl alcohol film with dichroic material such as iodine, performing crosslinking with a crosslinking agent and then performing uniaxial stretching. The dichroic polarizing plates tend to shrink since the manufacturing process includes this stretching step. In addition, because the polyvinyl alcohol film employs hydrophilic polymer, it is highly deformable especially under humidified conditions. Moreover, using a film as a base results in insufficient mechanical strength of the device, which may require a transparent protective film glued thereto.

In recent years, the liquid crystal display devices have been widely used in many purposes and the functionalities of them have been sophisticated. Accordingly, high reliability and durability are required on each device constituting the liquid crystal display devices. For example, in the case of liquid crystal display devices using a light source with a large luminous energy such as transmissive liquid crystal projectors, polarizing plates are exposed to intensive radiant rays. Consequently, the polarizing plates used for these are required to have an excellent heat-resisting property. However, since the above described film-based polarizing plates are made of organic materials, a limitation exists in enhancement of the property.

An inorganic polarizing plate having an excellent heat-resisting property is commercially available from Corning Incorporated in the USA under the trade name of POLARCOR™ (a highly durable borosilicate glass containing elongated silver crystals). This polarizing plate has a structure in which silver particles are diffused into glass and uses no organic material such as a film. The principle of this utilizes plasma resonance absorption of island particles. Particularly, it utilizes light absorption by surface plasma resonance occurring when light enters into the island particles of precious metals or transition metals and the absorption wavelength depends on the shapes of the particles and the permittivity therearound. Using elliptical-shaped island particles can differentiate the resonance wavelengths in major and minor axis directions, thereby achieving a polarizing property, in particular, they absorb polarized components parallel to the major axis and transmit polarized components parallel to the minor axis in long wavelength range. However, the POLARCOR, which only polarizes lights in the wavelength range near infrared region, does not cover visible light range required in liquid crystal displays. This is due to the physical property of silver used for the island particles.

Patent literature (PTL) 1 discloses a UV polarizing plate using silver as metal particles, wherein the particles are educed in glass by heat reduction to apply the above described principle. In this case, it is suggested that absorption in minor axis is utilized in contrast to the above mentioned POLARCOR. Although FIG. 1 of PTL 1 shows a function as a polarizing plate near 400 nm, the extinction ratio is small and the absorbable wavelength range is extremely narrow such that the polarizing plate cannot cover the entire visible light range even if POLARCOR and the technologies of PTL 1 are combined.

Non patent literature (NPL) 1 theoretically analyzes inorganic polarizing plates using plasma resonance of metal island particles. This literature describes that resonance wavelength of aluminum particles is approximately 200 nm shorter than that of silver particles, so that a polarizing plate covering visible light range can possibly be manufactured by using aluminum particles.

NPL 2 discloses some methods of manufacturing a polarizing plate by using aluminum particles. According to this literature, silicate-based glasses are not preferable for the substrate since aluminum reacts with the glasses and calcium aluminoborate glasses are suitable for this purpose (paragraphs 0018 and 0019). This limitation is at an economic disadvantage since the silicate-based glasses are widely spread as optical glasses and reliable products of them can be obtained at low cost. The literature also describes a method for forming island particles by etching a resist pattern (paragraphs 0037 and 0038). In general, a polarizing plate used in a projector is required to have a size of several centimeters and a high extinction ratio. Consequently, in the case of a polarizing plate for visible light, the resist pattern should have a size of several tens nanometers in order to be sufficiently shorter than visible light wavelengths and the high extinction ratio requires a high density pattern. Moreover, when used in a projector, a large area is required. In the described method of forming a high-density micro pattern by lithography, however, electron beam drawing technology and the like should be used to obtain the above-described pattern. The electron beam drawing technology, which draws respective patterns by electron beam, is not practical due to the low productivity thereof.

Although PTL 2 describes that aluminum are removed with chlorine plasma, in this case, chloride is likely to adhere to the aluminum pattern etched in such a manner. The chloride can be removed with a commercially available wet etchant (for example, SST-A2 available from Tokyo Ohka Kogyo Co., Ltd. in Japan); however, the etchant of this kind reacting with aluminum chloride also reacts with aluminum with a lower etching rate, making it difficult to form a desired pattern by using the described method.

In addition, PTL 2 also describes another method in which aluminum is deposited on a photo resist by glancing angle deposition (GLDA) and then the photo resist is removed (paragraphs 0045 and 0047). In this kind of method, it is contemplated that aluminum must be deposited also on the substrate surface in a certain extent to obtain an adhesion between the substrate and the aluminum. This means, however, the shape of the deposited aluminum film will differ from prolate sphere including prolate spheroid described as a suitable shape in paragraph 0015. As described in paragraph 0047, over-deposited materials are removed by anisotropic etching perpendicular to the surface. The shape anisotropy of aluminum is essential for the function of the polarizing plate. It therefore seems to be necessary that the amounts of aluminum deposited on resist part and substrate surface should be adjusted in order to obtain a desired shape by etching; however, controlling these in a size less than sub-micron size, such as 0.05 μm as described in paragraph 0047 is extremely difficult. Consequently, the productivity of this manufacturing method is suspicious. In addition, although the polarizing plate is required to have a property of a high transmittance in transmission axis direction, in the case of glass substrate, reflection of several percent from the glass interface is usually unavoidable, making it difficult to obtain the high transmittance.

PTL 3 discloses a method of forming a polarizing plate by glancing angle deposition (GLDA). This method, which obtains a polarizing property by forming micro-prismatic structures by glancing angle deposition of materials transparent and opaque to wavelengths in used bandwidth, seems to have a high productivity since micro patterns can be obtained by a process easier than the process explained in PTL 1. It should be noted that, the aspect ratio of the micro-prismatic structures of the material opaque to wavelengths in used bandwidth, the distance between each micro-prismatic structure and the linearity of the micro-prismatic structures are essential parameters for obtaining an excellent polarizing property and these parameters should be intentionally controlled also from a view point of property reproducibility; however, intentionally controlling these parameters is difficult since this method utilizes a phenomenon in which initial deposition layer of vapor particles blocks the subsequent vapor particles so that the prismatic structures are obtained by the lack of deposition of the vapor particles due to this shading. For dealing this problem, described is a method of providing polishing traces on a substrate by a rubbing process before the vapor deposition. Since the particle diameter of the vapored film is at most several tens nanometers, pitches less than sub-micron size should be intentionally produced by polishing in order to control the anisotropy of the particles. Unfortunately, ordinary polishing sheets, having a limitation of sub-microns, cannot easily produce such microscopic polishing traces. Furthermore, although the resonance wavelength of Al particles strongly depends on the refractive index therearound and how to combine the transparent and opaque materials is important in this case, no combination is disclosed in PTL 3 for obtaining an excellent polarizing property in visible light range. In addition, similarly to the case of PTL 1, when using a glass for the substrate, reflection of several percent from the glass interface is unavoidable.

NPL 2 discloses a laminated polarizing plate ("LAMIPOL") for infrared communication. This has a laminated structure of Al and $SiO_2$ and, according to this literature, has an extremely high extinction ratio. NPL 3 describes that using Ge instead of Al, which is light absorbing part of LAMIPOL, can achieve a high extinction ratio at wavelengths less than 1 μm. Te (tellurium) is also expected to achieve a high extinction ratio, according to FIG. 3 of the NPL 3. Although LAMIPOL is an absorbing typed polarizing plate achieving a high extinction ratio as described above, since the size of the light receiving surface is the lamination thickness of the light absorbing and transmitting materials, LAMIPOL is not suitable for use in projectors requiring the size of several centimeters square.

PTL 4 describes a polarizing plate combining a wire grid structure and an absorbing film. In the case of using a metal or semiconductor material as the absorbing film, the property of the film strongly depends on the optical property of the material such that reflectance in a particular range can be controlled by adjusting the thickness of a dielectric layer between the material and the wire grid. However, this adjustment is difficult to be performed in a wide wavelength range.

Although the bandwidth can be expanded by using Ta or Ge having a high absorption capability, this makes absorption in transmittance axis direction larger, thus reducing transmittance in transmission axis direction, which is one of an important property of polarizing plates.

Application of fine particles to the absorption film has been proposed to solve the above-problem. However, conventional methods which directly deposit an absorbing film by using glancing angle deposition, which rely on self-organization by shadowing by the deposited absorbing film, are strongly affected by physical property of the material itself or roughness of the substrate, making it difficult to control the absorbing property.

CITATION LIST

Patent Literatures

PTL 1: U.S. Pat. No. 6,772,608
PTL 2: Japanese Unexamined Patent Publication No. 2000-147253
PTL 3: Japanese Unexamined Patent Publication No. 2002-372620
PTL 4: Japanese Unexamined Patent Publication No. 2008-216957

Non Patent Literatures

NPL 1: J. Opt. Soc. Am. A Vol. 8, No. 4 619-624
NPL 2: Applied Optics Vol. 25 No. 2 1986 311-314
NPL 3: J. Lightwave Tec. Vol. 15 No. 6 1997 1042-1050

Having regard to the above, an object of the present invention is to provide a polarizing plate having an excellent optical property and a method of manufacturing the same.

SUMMARY OF THE INVENTION

The inventors of the present invention found out that an excellent optical property can be obtained with a reduced reflectance by using a metal-containing semiconductor layer containing a metal as an absorbing layer to complete the present invention.

A polarizing plate according to an aspect of the present invention includes: a transparent substrate transmitting light in a used bandwidth; an absorbing layer having at least a metal-containing semiconductor layer containing a metal, the absorbing layer being arranged as a one-dimensional lattice shaped wire-grid structure having a pitch smaller than the wavelength of the light in the used bandwidth; and a reflective layer arranged as a one-dimensional lattice shaped wire-grid structure having a pitch smaller than the wavelength of light in the used bandwidth, wherein the absorbing layer and the reflective layer are layered on the transparent substrate in this order, or the reflective layer and the absorbing layer are layered on the transparent substrate in this order.

A method of manufacturing a polarizing plate according to an aspect of the present invention includes steps of: preparing a transparent substrate transmitting light in a used bandwidth; layering an absorbing layer having at least a metal-containing semiconductor layer, and a reflective layer in this order or in the opposite order; and forming a one-dimensional lattice shaped wire-grid structure having a pitch smaller than the wavelength of the light in the used bandwidth by etching.

The present invention can achieve an excellent optical property by using a metal-containing semiconductor layer containing a metal having a high extinction coefficient representing light absorption capability, thereby improving light-absorbing property in comparison with semiconductor layers and reducing reflectance in comparison with metal layers,

BRIEF DESCRIPTION OF THE DRAWINGS

Embodiments will now be described, by way of example only, with reference to the drawings, in which:

FIG. 13(A) is a graph showing etching depth versus etching time and FIG. 13(B) is a table showing calculation results.

FIG. 32(A) is a graph showing the optical property of the polarizing plate of Example 7 and FIG. 32(B) is a table showing average values of transmission axis transmittance Tp, absorption axis transmittance Ts, contrast CR (Tp/Ts), transmission axis reflectance Rp and absorption axis reflectance Rs in respective wavelength ranges of red (R), green (G) and blue (B).

FIG. 35(A) is a graph showing the optical property of the polarizing plate of Example 8 and FIG. 35(B) is a table showing average values of transmission axis transmittance Tp, absorption axis transmittance Ts, contrast CR (Tp/Ts), transmission axis reflectance Rp and absorption axis reflectance Rs in respective wavelength ranges of red (R), green (G) and blue (B).

DESCRIPTION OF THE PREFERRED EMBODIMENTS

Embodiments of the present invention will now be more particularly described with reference to the accompanying drawings according to the following order.
1. Constitution of a Polarizing Plate
2. Manufacturing Method of a Polarizing Plate
3. Examples 1. Constitution of a Polarizing Plate A polarizing plate according to an embodiment of the present invention includes: a transparent substrate transmitting light in a used bandwidth; an absorbing layer having at least a metal-containing semiconductor layer containing a metal, the absorbing layer being arranged as a one-dimensional lattice shaped wire-grid structure having a pitch smaller than the wavelength of the light in the used bandwidth; and a reflective layer arranged as a one-dimensional lattice shaped wire-grid structure having a pitch smaller than the wavelength of light in the used bandwidth, wherein the absorbing layer and the reflective layer are layered on the transparent substrate in this order, or the reflective layer and the absorbing layer are layered on the transparent substrate in this order. In other words, the polarizing plate according to this invention may be constituted by forming the absorbing layer and reflective layer in this order in the light incident direction. A dielectric layer arranged as a one-dimensional lattice shaped wire-grid structure having a pitch smaller than the wavelength of light in the used bandwidth may be formed between the absorbing layer and the reflective layer.

Figure 1:
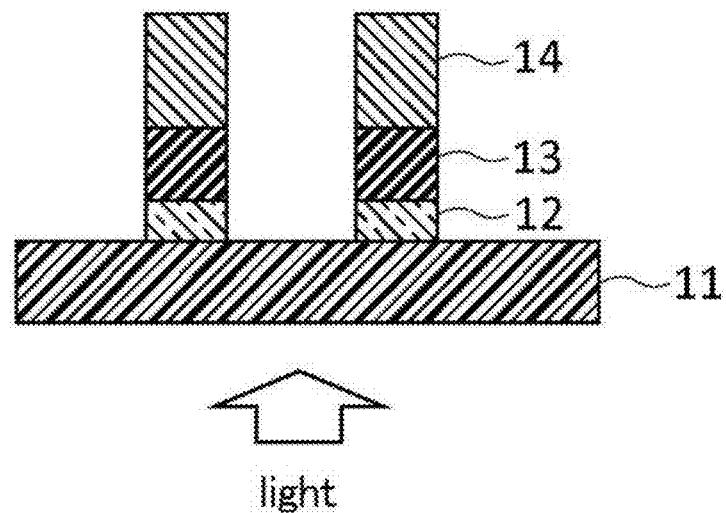
FIG. 1 is a schematic cross sectional view of a first polarizing plate according to an embodiment of the present invention.

FIG. 1 is a schematic cross sectional view of a first polarizing plate according to an embodiment of the present invention. As shown in FIG. 1, the first polarizing plate includes: a transparent substrate 11 transmitting light in a used bandwidth; an absorbing layer 12 having at least a metal-containing semiconductor layer containing a metal, the absorbing layer being arranged as a one-dimensional lattice shaped wire-grid structure having a pitch smaller than the wavelength of the light in the used bandwidth; a dielectric layer 13 arranged as a one-dimensional lattice shaped wire-grid structure having a pitch smaller than the wavelength of light in the used bandwidth; and a reflective layer 14 arranged as a one-dimensional lattice shaped wire-grid structure having a pitch smaller than the wavelength of light in the used bandwidth, wherein the absorbing layer 12, the dielectric layer 13 and the reflective layer 14 are layered on the transparent substrate 11 in this order. That is, the first polarizing plate has a one-dimensional lattice shaped wire-grid structure in which the convexities formed by layering the absorbing layer 12, the dielectric layer 13 and the reflective layer 14 in this order from the transparent substrate 11 are arranged with a regular interval on the transparent substrate 11.

Figure 2:
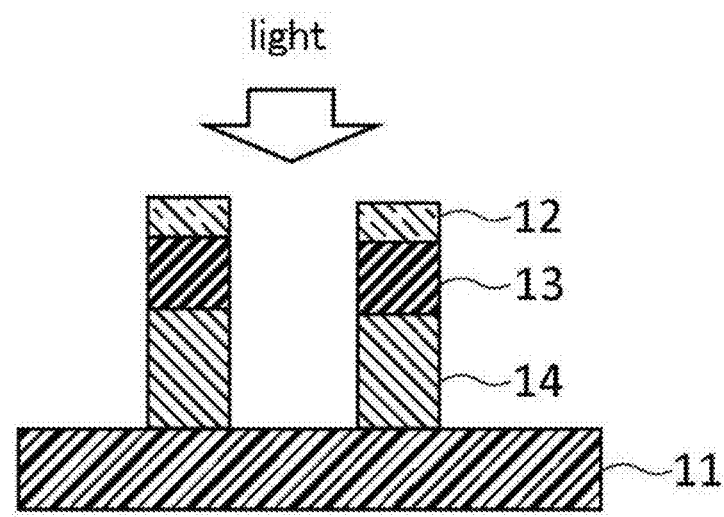
FIG. 2 is a schematic cross sectional view of a second polarizing plate according to an embodiment of the present invention.

FIG. 2 is a schematic cross sectional view of a second polarizing plate according to an embodiment of the present invention. As shown in FIG. 2, the first polarizing plate includes: a transparent substrate 11 transmitting light in a used bandwidth; an absorbing layer 12 having at least a metal-containing semiconductor layer containing a metal, the absorbing layer being arranged as a one-dimensional lattice shaped wire-grid structure having a pitch smaller than the wavelength of the light in the used bandwidth; a dielectric layer 13 arranged as a one-dimensional lattice shaped wire-grid structure having a pitch smaller than the wavelength of light in the used bandwidth; and a reflective layer 14 arranged as a one-dimensional lattice shaped wire-grid structure having a pitch smaller than the wavelength of light in the used bandwidth, wherein the reflective layer 14 the dielectric layer 13 and the absorbing layer 12, are layered on the transparent substrate 11 in this order. That is, the second polarizing plate has a one-dimensional lattice shaped wire-grid structure in which the convexities formed by layering the reflective layer 14, the dielectric layer 13 and the absorbing layer 12 in this order from the transparent substrate 11 are arranged with a regular interval on the transparent substrate 11.

In the first or second polarizing plate, a width of at least a portion of the absorbing layer 12 or dielectric layer 13 in the convexities of the one-dimensional lattice shaped wire-grid structure is preferably narrower than that of the reflective layer 14. In particular, the width of the absorbing layer 12 is preferably narrower than that of the reflective layer 14. This configuration can increase the transmittance and decrease the reflectance of the polarizing plate.

The transparent substrate 11 is formed of a material transparent to the light in the used optical bandwidth and having a refractive index of 1.1 to 2.2, such as glass, sapphire and crystal. In this embodiment, it is preferable to employ quartz crystal or sapphire having a high thermal conductivity as the material to form the transparent substrate 11. This achieves a high light-fastness against strong light, thereby realizing a polarizing plate suitable for use in an optical engine of a projector that produces large amount of heat.

In the case that the transparent substrate 11 is formed of an optically active crystal such as crystal quartz, excellent optical properties can be obtained by arranging the grid-shaped convexities in parallel or perpendicular direction relative to the optical axis of the crystal. The "optical axis" used herein means a directional axis that minimizes the difference between refractive indices of ordinary ray (O) and extraordinary ray (E) of the light travelling along the direction thereof.

It should be noted that, depending on the application of the polarizing plate, glass, particularly quartz (refractive index of 1.46) or soda-lime glass (refractive index of 1.51) may be used. Since the component composition of the glass material has no special limitation, inexpensive glass materials such as silicate glass can be used and thus producing cost can be reduced.

The absorbing layer 12 comprises more than one layer including at least a metal-containing semiconductor layer containing a metal. The metal-containing semiconductor can improve light-absorbing property in comparison with semiconductor layers and reduce reflectance in comparison with metal layers since it contains a metal having a high extinction coefficient representing light absorption capability.

Examples of semiconductor materials for the metal-containing semiconductor layer include Si, Ge, Te and ZnO. Since the band gap energy of the semiconductor material affects the absorption effect, the band gap energy of the semiconductor must be below the used optical bandwidth. For example, when used with visible light, a semiconductor material absorbing wavelengths 400 nm or more, therefore having a band gap of 3.1 eV or less must be used. Furthermore, examples of the metal contained in the metal-containing semiconductor layer include Ta, Al, Ag, Cu, Au, Mo, Cr, Ti, W, Ni, Fe, Sn and Nb.

Preferably, the metal content of the metal-containing semiconductor layer is 50 atomic percent or less. Excessive amount of metal content contained in the metal-containing semiconductor layer might reduce transmittance. Furthermore, a preferable semiconductor material of the metal-containing semiconductor is a material easily deposited to form a film such as Si. More preferable combinations for the metal-containing semiconductor layer include Fe-containing Si (Si which contains Fe) and Ta-containing Si (Si which contains Ta).

In addition to the metal-containing semiconductor layer, the absorbing layer 12 further includes a metal layer and the width of the metal layer is preferably narrower than that of the reflective layer 14. This can reduce the reflectance of the polarizing plate. The width of the absorbing layer 12 can be controlled by etching and the amount of side etching can be controlled with etching gas pressure and He gas pressure for cooling the substrate.

In addition to the metal-containing semiconductor layer, the absorbing layer 12 preferably includes a metal layer or a semiconductor layer. This can suppress reflectance, improve transmittance and increase contrast (extinction ratio: transmission axis transmittance/absorption axis transmittance).

In the case of using Fe-containing Si as the metal-containing semiconductor layer, the Fe content is preferably 50 atomic percent or less. Fe content more than 50 atomic percent will make etching difficult even if gaseous species are altered. Furthermore, 10 atomic percent or less of the content is more preferable in order to apply $CF_4$ etching widely used in semiconductor etching processes.

In the case of using Fe-containing Si as the metal-containing semiconductor layer, it is preferable to form a Ta layer in the absorbing layer 12 in order to improve the reduction effect of the reflectance. In addition, when forming the Ta layer, it is preferable to form the absorbing layer 12 in the order of the Ta layer and the metal-containing semiconductor layer in the light incident direction. The film thickness of the metal-containing semiconductor layer is preferably thicker than that of the Ta layer. This can achieve a low reflectance and a high transmittance. This can also improve absorption and interference effects to increase the contrast (extinction ratio: transmission axis transmittance/absorption axis transmittance)

In the case of using Ta-containing Si as the metal-containing semiconductor layer, the Ta content is preferably 40 atomic percent or less. In the range of the Ta content of 40 atomic percent or less, the reflectance is 4% or less, which is same as a glass interface level, and the transmittance is high such that a reduced reflectance and a high transmittance can be maintained in practice.

In the case of using Ta-containing Si as the metal-containing semiconductor layer, it is preferable to form a Ta layer in the absorbing layer 12 in order to improve the reduction effect of the reflectance. In addition, when forming the Ta layer, it is preferable to form the absorbing layer 12 in the order of the Ta layer and the metal-containing semiconductor layer in the light incident direction. The film thickness of the metal-containing semiconductor layer is preferably thicker than that of the Ta layer. This can achieve a low reflectance and a high transmittance. This can also improve absorption and interference effects to increase the contrast (extinction ratio: transmission axis transmittance/absorption axis transmittance).

It is preferable to form the absorbing layer 12 as a high-density film by means of vapor deposition or spattering. The high-density film will improve the thermal conductivity and heat dissipation.

The dielectric layer 13 is formed to have a film thickness that shifts a phase of a polarized light transmitted through the absorbing layer 12 and reflected at the reflective layer 14 by a half wavelength relative to the light entered from the transparent substrate 11. Actual film thickness is appropriately determined within the range of 1 to 500 nm capable of adjusting the phase to enhance the interference effect. In the present embodiment, since the absorbing layer 12 absorbs the reflected light, the contrast will be improved without optimizing the film thickness, so that it may be practically determined by balancing a desired polarizing property and an actual manufacturing process.

As for the material constituting the dielectric layer 13, conventional materials including $SiO_2$, $Al_2O_3$ and $MgF_2$ can be used. The refractive index of the dielectric layer 13 is preferably in the range of 1.0 to 2.5. The property of the polarizing plate may be controlled by the material of the dielectric layer 13 since the optical property of the absorbing layer 12 is also affected by the refractive index therearound.

The reflective layer 14 is formed on the dielectric layer 13 by arranging belt-shaped metal films extending in Y direction, which is the absorption axis of the dielectric layer 13. That is, the reflective layer 14 has a function as a wire grid polarizer that attenuates the polarized wave having an electric field component parallel to the longitudinal direction (Y-axis direction) of the wire grid (TE wave (S-polarized wave)) of the light entered from the transparent substrate 11 and transmits the polarized wave having an electric field component perpendicular to the longitudinal direction (X-axis direction) of the wire grid (TM wave (P-polarized wave)).

The material constituting the reflective layer 14 is not specially limited as long as it reflects the light in the used bandwidth; for example, simple substances such as Al, Ag, Cu, Mo, Cr, Ti, Ni, W, Fe, Si, Ge and Te, alloys of these substances and semiconductor materials may be used. Instead of metal materials, it can be constituted by inorganic film other than metal or resin film formed to have a surface with a high reflectance by coloring, for example.

The pitch, line width/pitch, film height (thickness, grid depth) and film length (grid length) of the reflective layer 14 are preferably in the following ranges.

0.05 µm<pitch<0.8 µm
0.1<(line width/pitch)<0.9
0.01 µm<height<1 µm
0.05 µm<film length It is preferable to provide a protective film covering the surfaces of the transparent substrate 11 and the grid-shaped convexities as long as the change of the optical property has no effect on practical use. For example, depositing $SiO_2$ will improve reliability such as moisture resistance. The protective film is preferably formed by plasma chemical vapor deposition (CVD). The plasma CVD can deposit the protective film also in the gaps between the grid-shaped convexities.

The polarizing plate in this constitution can attenuate the polarized wave having an electric field component parallel to the grid of the reflective layer (TE wave (S-polarized wave)) and transmit the polarized wave having an electric field component perpendicular to the grid of the reflective layer (TM wave (P-polarized wave)) by utilizing four activities of transmission, reflection, interference and selective light absorption of the polarized waves. In other words, TE wave is attenuated by the selective light absorbing effect of the absorbing layer 12 and TE wave transmitted through the absorbing layer 12 and the dielectric layer 13 is reflected by the grid-shaped reflective layer 14 that functions as a wire grid. By appropriately adjusting the thickness and refractive index of the dielectric layer 13, a part of the TE wave reflected by the reflective layer 14 and being transmitted through the absorbing layer 12 can be reflected back to the reflective layer 14, and the light transmitted through the absorbing layer 12 can be attenuated by interference. A desired polarizing property can be obtained by this selective attenuation of TE wave.

By using a metal-containing semiconductor layer as the light absorbing layer containing a metal having a high extinction coefficient representing light absorption capability, the polarizing plate of the present embodiment can improve light-absorbing property in comparison with semiconductor layers and reduce reflectance in comparison with semiconductor layers to achieve an excellent optical property. Since the design range of the present polarizing plate is wider than that of conventional ones, it is possible to provide a polarizing plate having a desired extinction ratio in a visible light range.

Moreover, the polarizing plate of the present embodiment, constituted by inorganic material having a durability higher than that of organic material, has an improved reliability with a high light-fastness against strong light such as a light used in liquid crystal projectors. Furthermore, the polarizing plate of the present embodiment, capable of reducing reflectance in a wide wavelength range, can be applied to general purpose polarizing plates such as polarizing filters for cameras and polarizing plates for liquid crystal television monitors.

2. Manufacturing Method of a Polarizing Plate

A manufacturing method of a polarizing plate according to the present embodiment will be explained hereinafter. A method of manufacturing a polarizing plate according to the present embodiment includes steps of: preparing a transparent substrate transmitting light in a used bandwidth; layering an absorbing layer having at least a metal-containing semiconductor layer, and a reflective layer in this order or in the opposite order; and forming a one-dimensional lattice shaped wire-grid structure having a pitch smaller than the wavelength of the light in the used bandwidth by etching.

The method of manufacturing the first polarizing plate shown in FIG. 1 will be explained hereinafter. In the manufacturing method of the first polarizing plate, firstly, the absorbing layer 12, the dielectric layer 13 and the reflective layer 14 are deposited on the transparent substrate 11 in this order.

The absorbing layer 12 is deposited by means of vapor deposition or spattering. More particularly, the deposition of the absorbing layer 12 is conducted by positioning the transparent substrate 11 against a target and making argon particles to collide the target, such that the target material removed by the collision impact is deposited on the transparent substrate 11. The metal-containing semiconductor layer can be deposited by using a metal-containing semiconductor target such as an Fe-containing silicon target and a Ta-containing silicon target.

In addition, the dielectric layer 13 and the reflective layer 14 can be formed by a typical vacuum deposition method including sputtering method, vapor growth method and vapor deposition method, or sol-gel method (for example, a method in which a sol is coated by spin coating and then gelated by thermosetting).

A grid-shaped mask pattern is formed by nanoimprint or lithography on the reflective layer 14 deposited by the process described above and then grid-shaped convexities are formed by dry etching. Gases usable in the dry etching include $Ar/O_2$ for anti-reflecting coating (BARC), $Cl_2/BCl_3$ for AlSi and $CF_4/Ar$ for $SiO_2$, Si and Ta. Optimizing etching conditions (gas flow rate, gas pressure, power and cooling temperature of the substrate) will achieve a grid shape having a high verticality. The width (in X-axis direction) of the absorbing layer 12 can also be adjusted by the etching conditions.

In addition, when etching the grid-shaped convexities between grids, a transparent material easily etched by $CF_4$ such as $SiO_2$ and $Ta\ O_5$ may be deposited on the substrate within a range having no effect on the polarizing performance. The material may be removed by etching partially or entirely.

In the case when Al or AlSi is used for the reflective layer 14, materials capable of being etched by fluorine are preferably selected as materials for the absorbing layer 12 and the dielectric layer 13. This results in a high etching selectivity, thereby widening the range of film thickness design value of the absorbing layer 12 and the dielectric layer 13, which is advantageous in view of process construction.

It is possible to deposit a protective film such as an $SiO_2$ film on the top portion for improving reliability such as moisture resistance as long as the change of the optical property has no effect on practical use.

3. EXAMPLES

Examples of the present invention will be explained hereinafter. In these examples, polarizing plates having a metal-containing semiconductor layers as absorbing layers were formed and their optical properties were evaluated. It should be noted that the present invention is not limited to these examples.

Comparative Example

Figure 3:
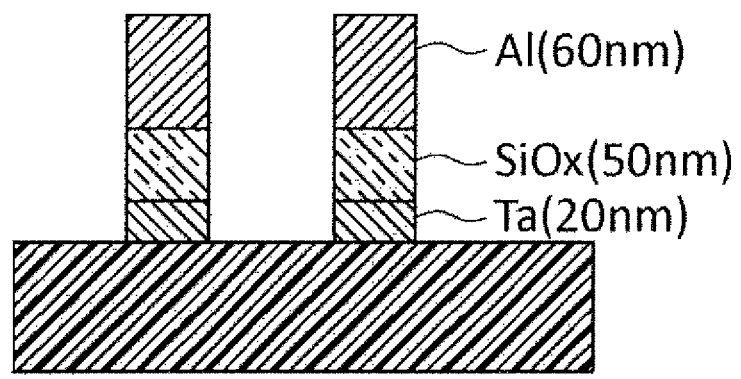
FIG. 3 is a schematic cross sectional view of a conventional polarizing plate.

FIG. 3 is a schematic cross sectional view of a conventional polarizing plate. Firstly, 20 nm of Ta, 50 nm of SiOx and 60 nm of Al were sequentially deposited on a transparent substrate by spattering method and a grid structure having a pitch of 140 nm was formed by dry etching.

Figure 4A:
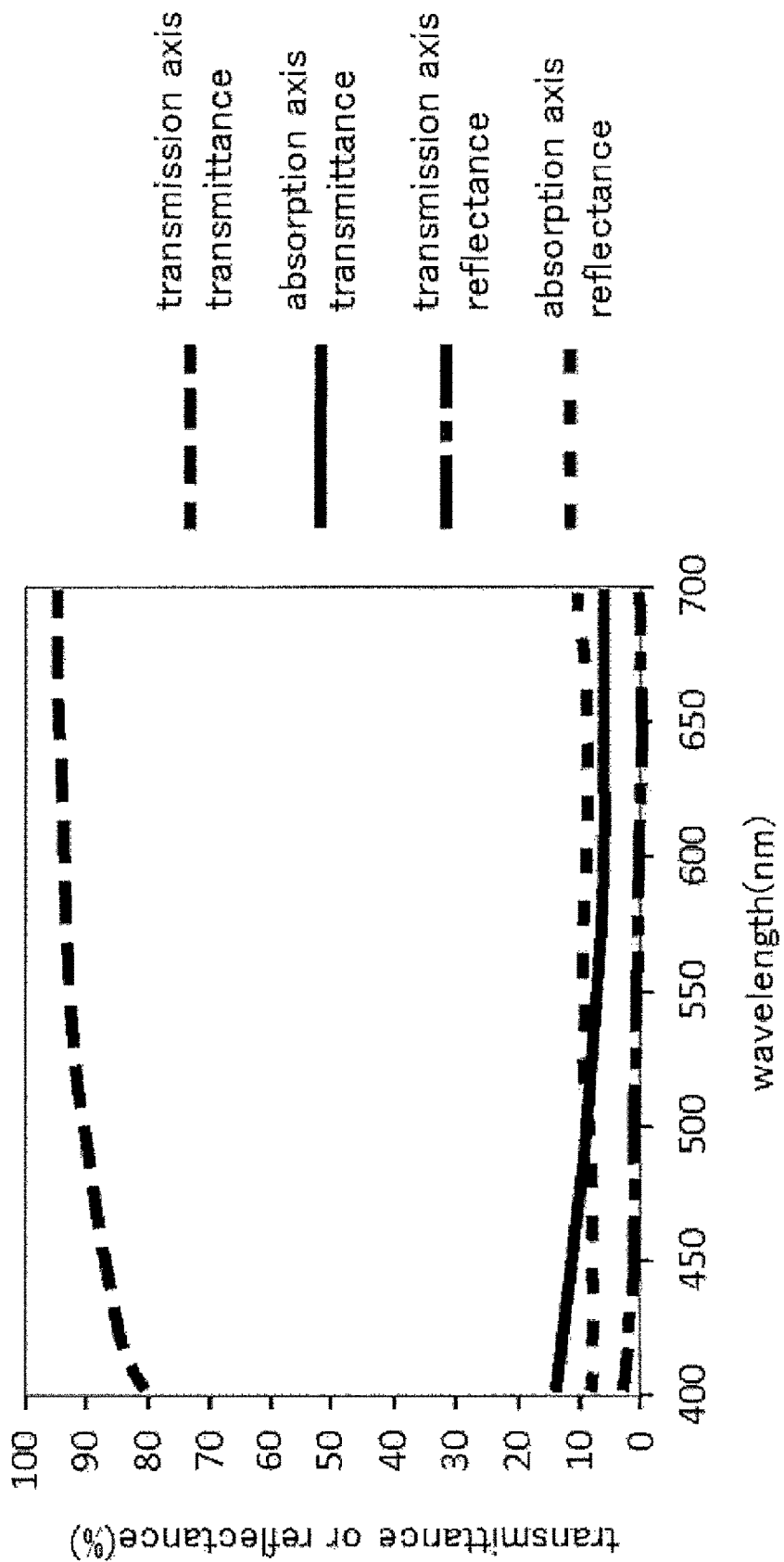
FIG. 4(A) is a graph showing the optical property (transmittance or reflectance) of the polarizing plate of the comparative example and FIG. 4(B) is a graph showing a part of FIG. 4(A) by changing the scale of the vertical axis.
Figure 4B:
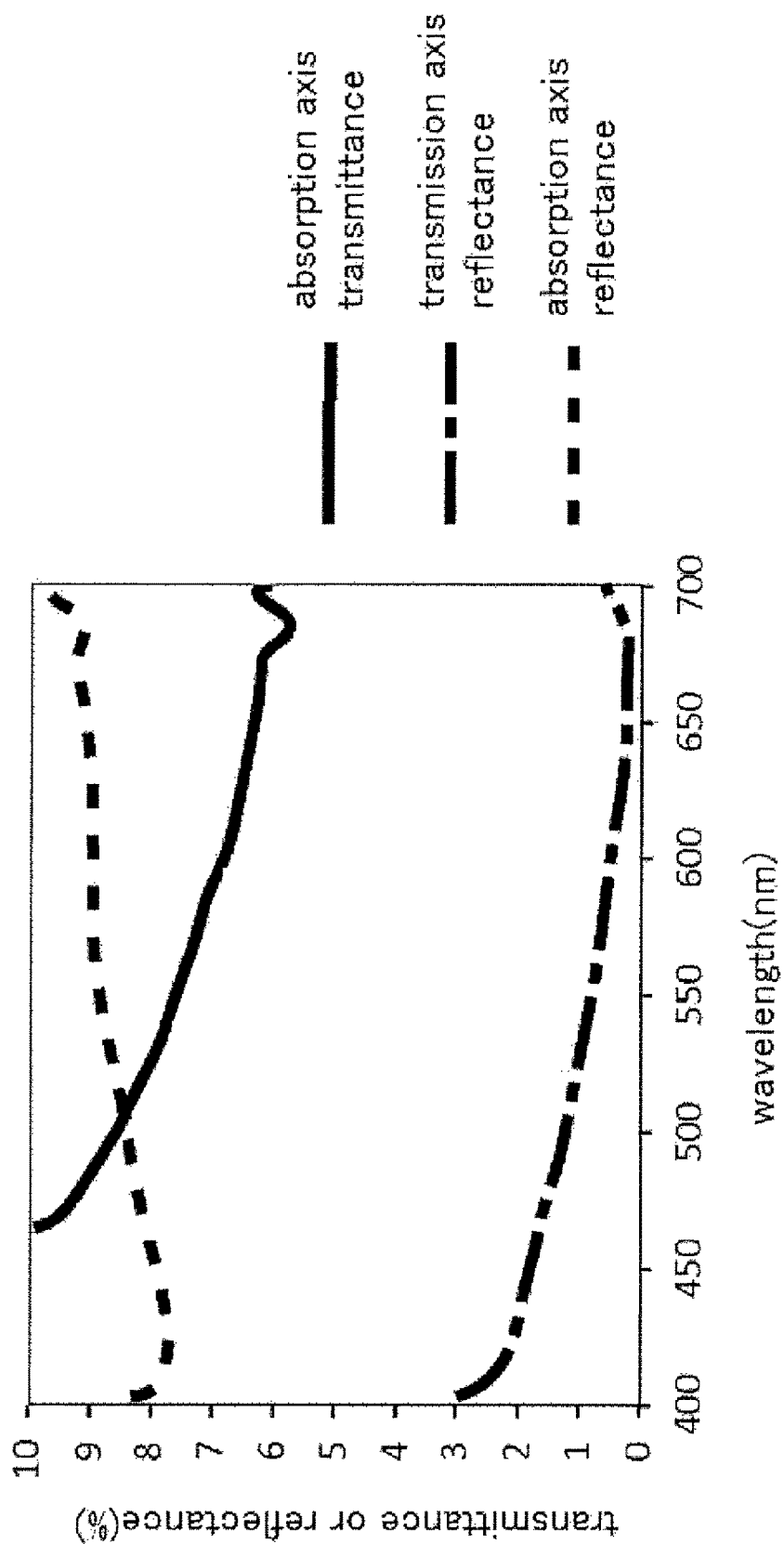

FIG. 4(A) is a graph showing the optical property (transmittance or reflectance) of the polarizing plate of the comparative example and FIG. 4(B) is a graph showing a part of FIG. 4(A) by changing the scale of the vertical axis. Although Ta works effectively as a light-absorbing film, the absolute value of the reflectance of Ta is around 10% as shown in FIGS. 4(A) and 4(B), which is much higher than the reflectivities of organic polarizing plates used in ordinal liquid crystal television monitors and liquid crystal monitors. It is therefore difficult for conventional polarizing plates to achieve a low reflectance in a wide visible wavelength range.

Example 1

Figure 5:
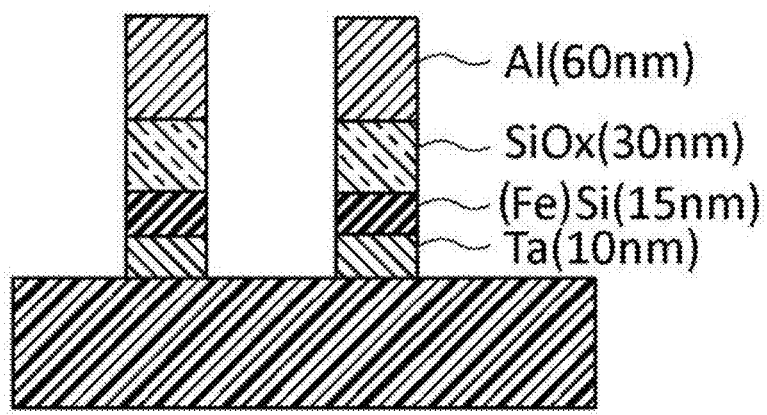
FIG. 5 is a schematic cross sectional view of the polarizing plate of Example 1.

FIG. 5 is a schematic cross sectional view of the polarizing plate of Example 1. Firstly, 10 nm of Ta, 15 nm of Si with 5% Fe, 30 nm of SiOx and 60 nm of Al were sequentially deposited on a transparent substrate by spattering method and a grid structure having a pitch of 140 nm was formed by dry etching. Si with 5% Fe was deposited by using a silicon target containing 5 atomic percent of Fe.

Figure 6A:
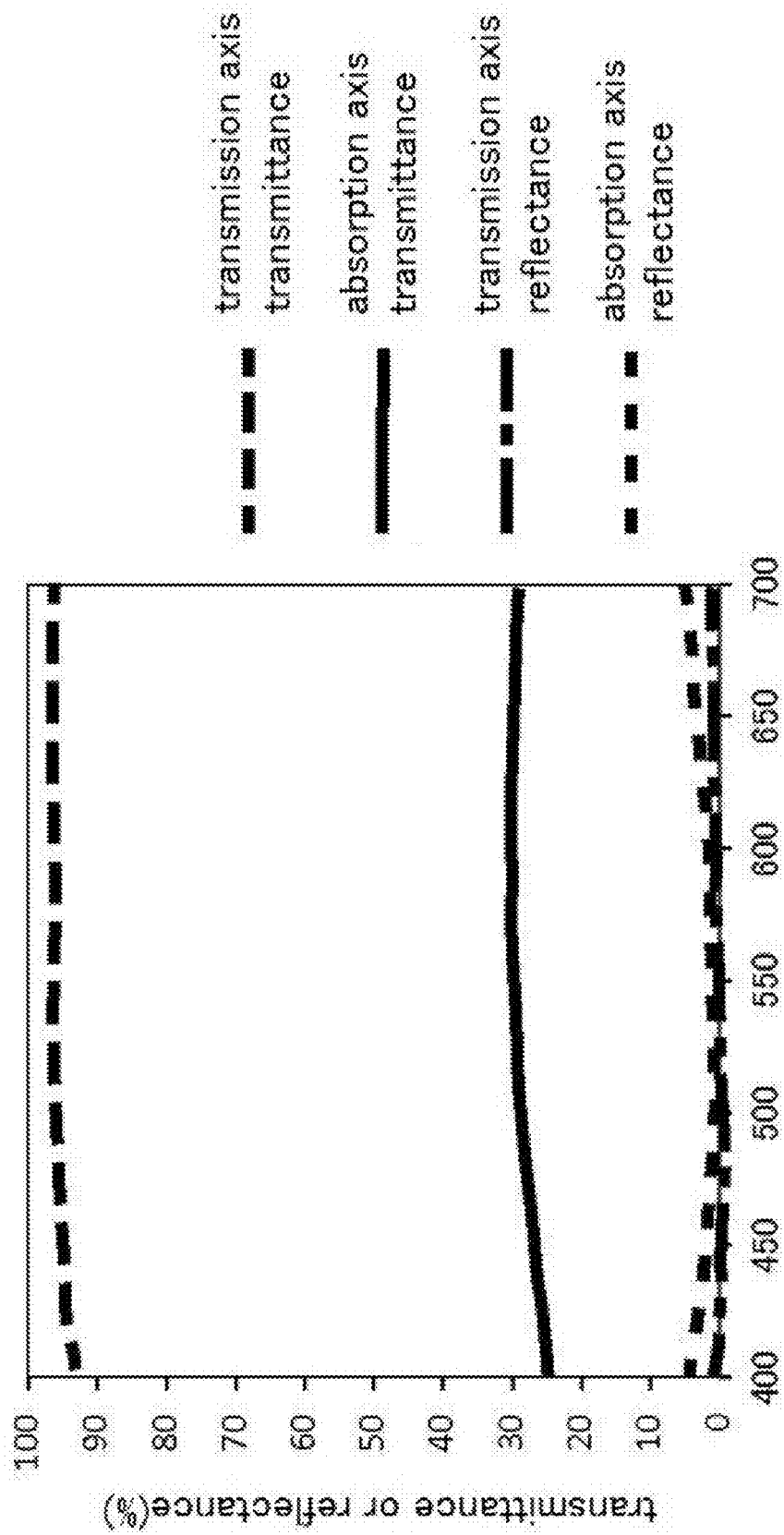
FIG. 6(A) is a graph showing the optical property (transmittance or reflectance) of the polarizing plate of Example 1 and FIG. 6(B) is a graph showing a part of FIG. 6(A) by changing the scale of the vertical axis.
Figure 6B:
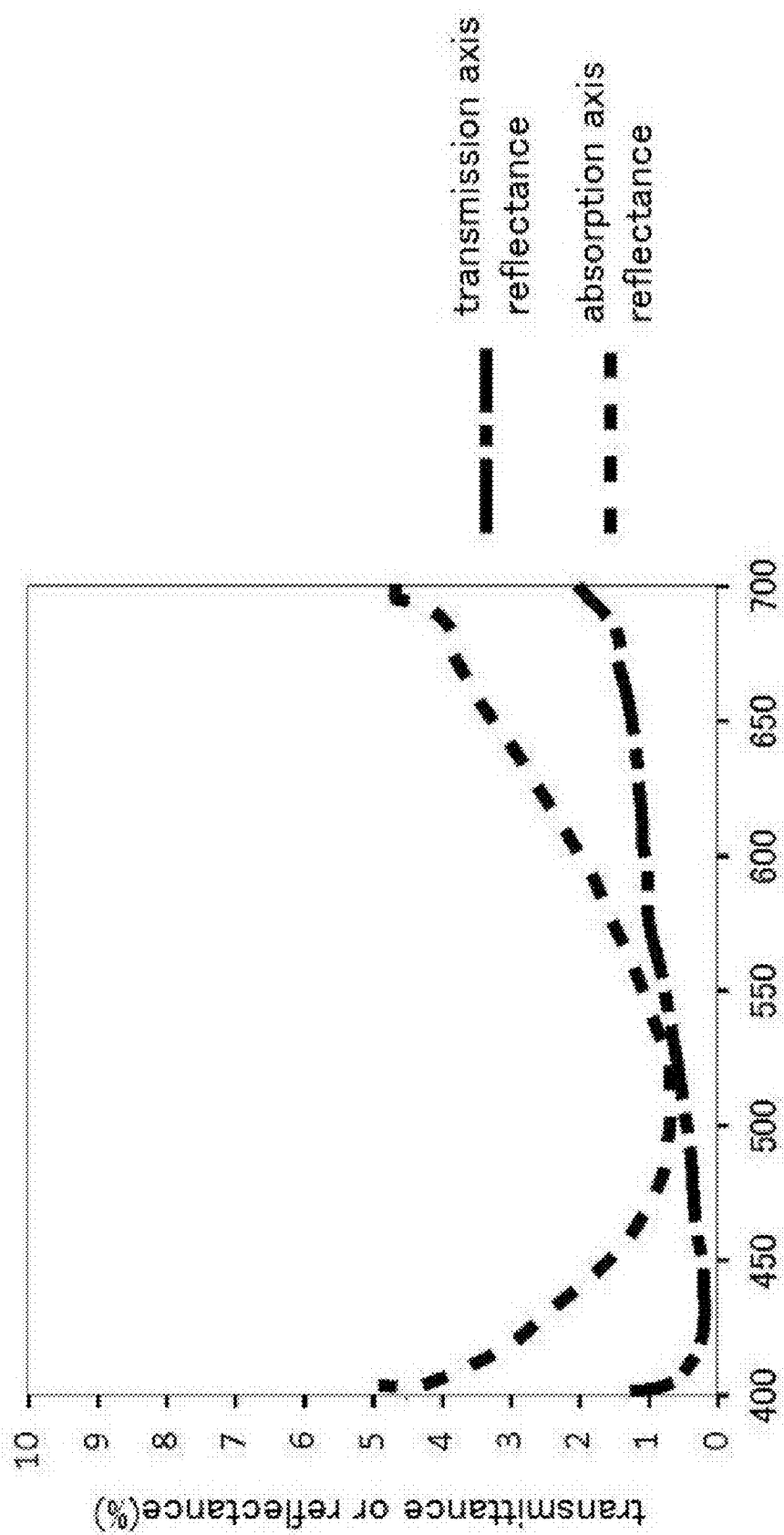

FIG. 6(A) is a graph showing the optical property (transmittance or reflectance) of the polarizing plate of Example 1 and FIG. 6(B) is a graph showing a part of FIG. 6(A) by changing the scale of the vertical axis. As can be seen from the comparison between FIG. 6(B) and FIG. 4(B), the polarizing plate of Example 1 could remarkably reduce the reflectance. In particular, the reflectivity in the green range with high luminous sensitivity could be reduced to 2% or less. In addition, the polarizing plate of Example 1 could reduce the reflectance in a wide visible wavelength range as compared with the comparative example. This revealed that the reflectance can be remarkably reduced by using a metal-containing semiconductor layer as an absorbing layer.

Example 2

Next, the effect of reflectance reduction of metal-containing semiconductor layer was validated by a simulation based on Rigorous Coupled Wave Analysis (RCWA) method.

Figure 7:
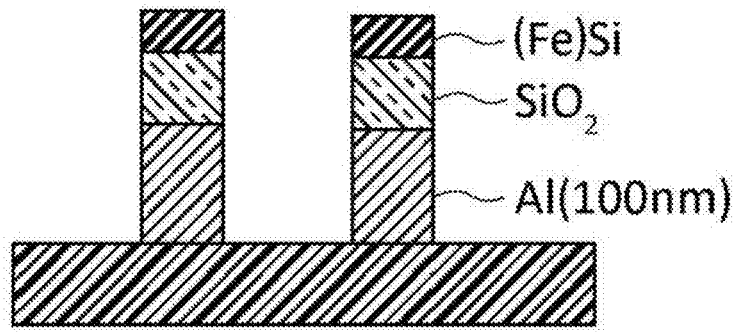
FIG. 7 is a schematic cross sectional view of the polarizing plate used in the first simulation.
Figure 8:
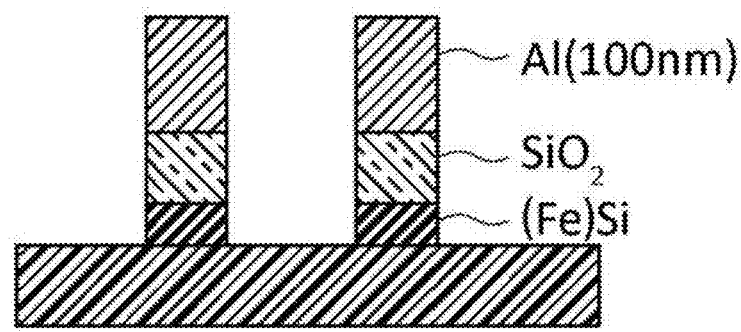
FIG. 8 is a schematic cross sectional view of the polarizing plate used in the second simulation.

FIG. 7 is a schematic cross sectional view of the polarizing plate used in the first simulation and FIG. 8 is a schematic cross sectional view of the polarizing plate used in the second simulation. The polarizing plate used in the first simulation includes a reflective layer, a dielectric layer and an absorbing layer formed on a substrate in this order equally as the second polarizing plate shown in FIG. 2. The absorbing layer is formed of Fe-containing Si, the dielectric layer is formed of $SiO_2$ and the reflective layer is formed of Al. The polarizing plate used in the second simulation includes an absorbing layer, a dielectric layer and a reflective layer formed on a substrate in this order equally as the first polarizing plate shown in FIG. 1. The absorbing layer is formed of Fe-containing Si, the dielectric layer is formed of $SiO_2$ and the reflective layer is formed of Al.

Figure 9:
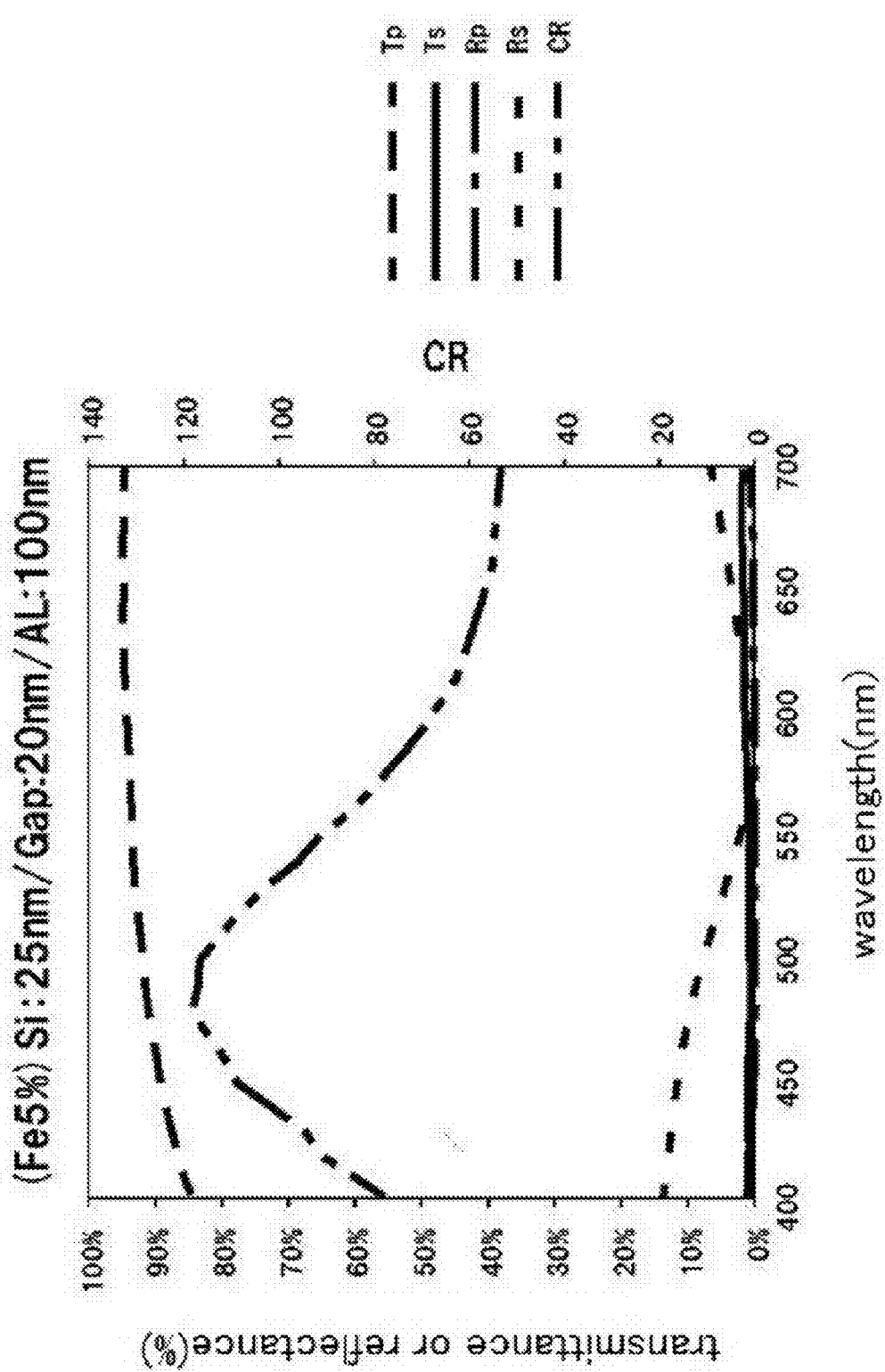
FIG. 9 is a graph showing the optical property of the polarizing plate of the first simulation when using 5 atomic percent of Fe-containing Si as the absorbing layer.

FIG. 9 is a graph showing the optical property of the polarizing plate of the first simulation when using 5 atomic percent of Fe-containing Si (silicon which contains Fe by 5 atomic percent) as the absorbing layer. In this simulation, the polarizing plate with a grid structure having a pitch of 140 nm was formed by layering 100 nm of Al, 20 nm of $SiO_2$ and 25 nm of 5 atomic percent of Fe-containing Si on the substrate in this order.

Figure 10:
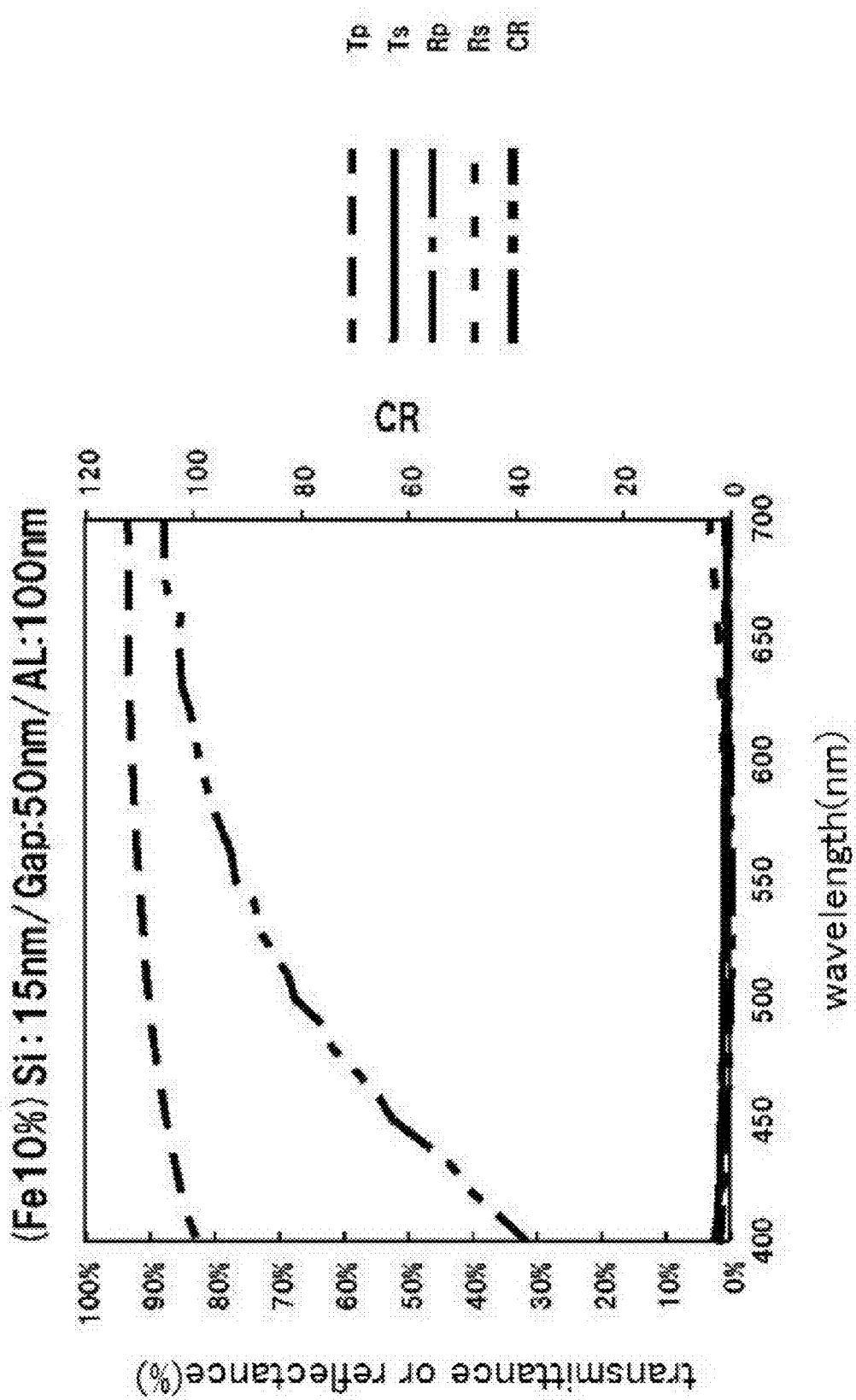
FIG. 10 is a graph showing the optical property of the polarizing plate of the first simulation when using 10 atomic percent of Fe-containing Si as the absorbing layer.

FIG. 10 is a graph showing the optical property of the polarizing plate of the first simulation when using 10 atomic percent of Fe-containing Si as the absorbing layer. In this simulation, the polarizing plate with a grid structure having a pitch of 140 nm was formed by layering 100 nm of Al, 50 nm of $SiO_2$ and 15 nm of 10 atomic percent of Fe-containing Si on the substrate in this order.

Figure 11:
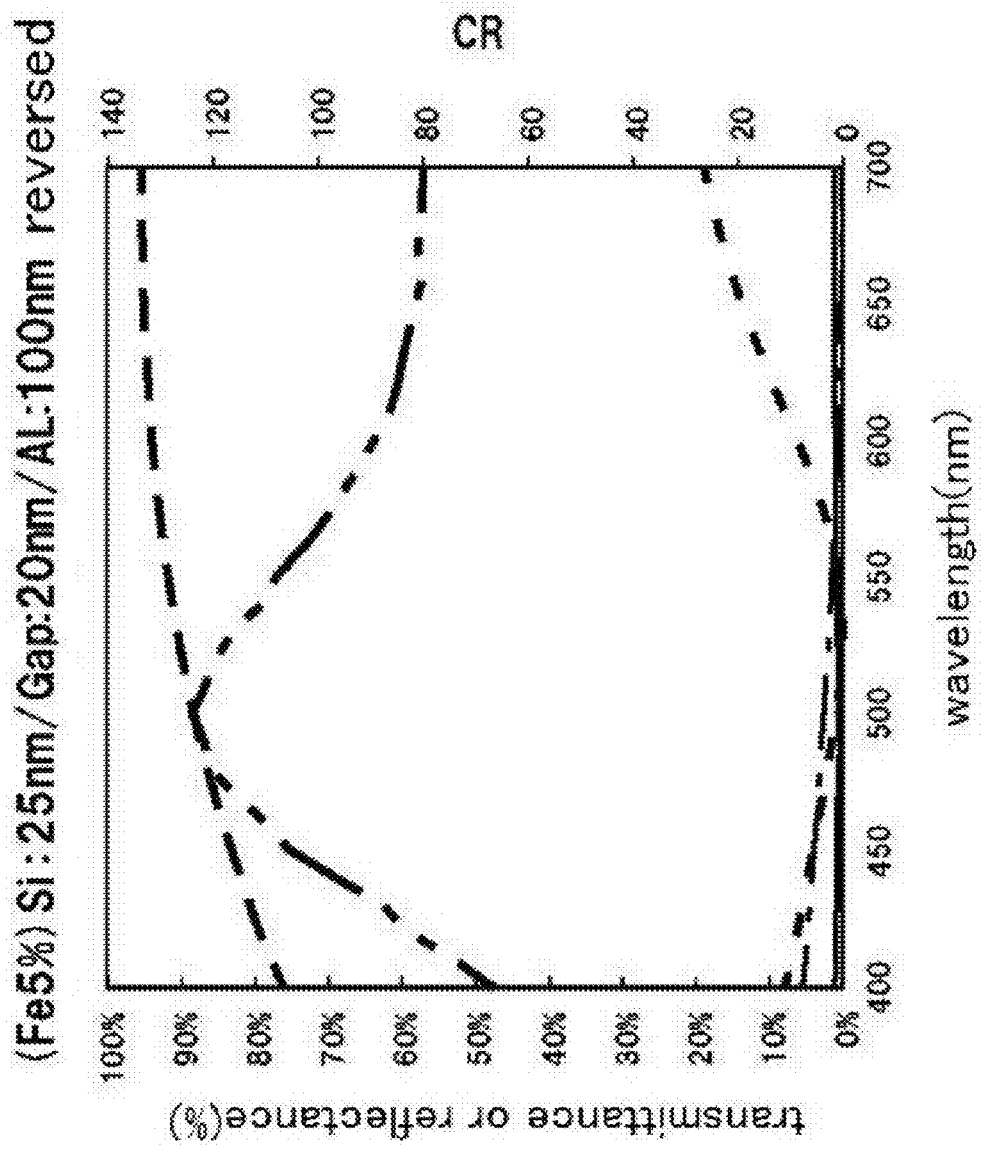
FIG. 11 is a graph showing the optical property of the polarizing plate of the second simulation when using 5 atomic percent of Fe-containing Si as the absorbing layer.

FIG. 11 is a graph showing the optical property of the polarizing plate of the second simulation when using 5 atomic percent of Fe-containing Si as the absorbing layer. In this simulation, the polarizing plate with a grid structure having a pitch of 140 nm was formed by layering 25 nm of 5 atomic percent of Fe-containing Si, 20 nm of $SiO_2$ and 100 nm of Al on the substrate in this order.

Figure 12:
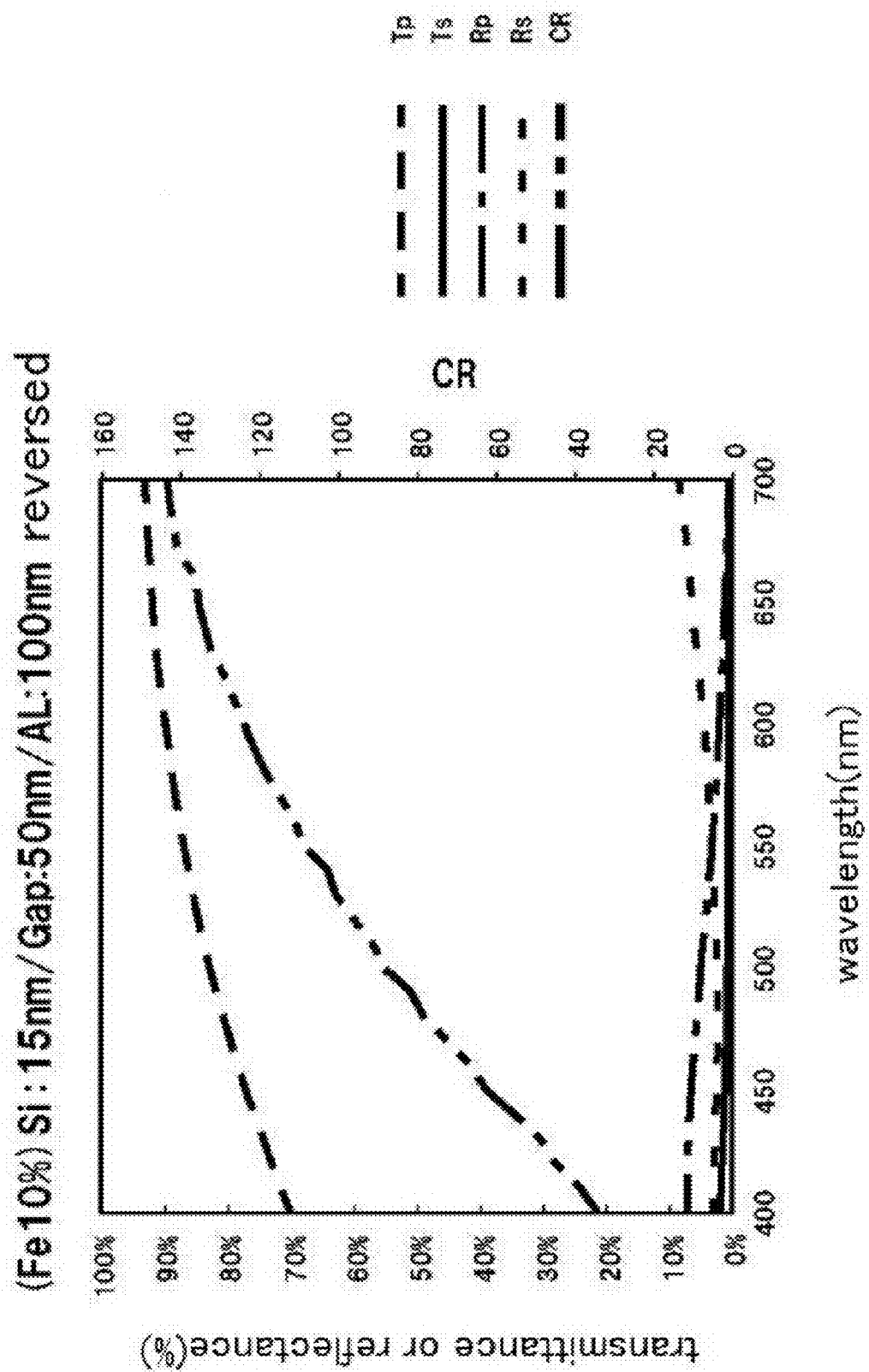
FIG. 12 is a graph showing the optical property of the polarizing plate of the second simulation when using 10 atomic percent of Fe-containing Si as the absorbing layer.

FIG. 12 is a graph showing the optical property of the polarizing plate of the second simulation when using 10 atomic percent of Fe-containing Si as the absorbing layer. In this simulation, the polarizing plate with a grid structure having a pitch of 140 nm was formed by layering 15 nm of 10 atomic percent of Fe-containing Si, 50 nm of $SiO_2$ and 100 nm of Al on the substrate in this order.

As shown in FIGS. 9 and 11, when using 5 atomic percent of Fe-containing Si for the absorbing layer, although the reduction in reflectance in a wide wavelength range is not sufficient, the reduction in reflectance in green range with 500 nm wavelength, which is important for visible light polarizing plates, is sufficient such that this can be used as a channel polarizing plate for liquid crystal projectors. For the reduction of reflectance in a wide wavelength range, layering Ta is effective as shown in Example 1.

In addition, as shown in FIGS. 10 and 12, when using 10 atomic percent of Fe-containing Si for the absorbing layer, the reflectance in a wide wavelength range can be reduced without layering Ta as shown in Example 1. This reveals that the reflectance can be adjusted by Fe content such that increasing Fe content will improve the reflectance reduction effect in a wide wavelength range.

Example 3

Next, the effect of Fe content on actual manufacturing processes was verified. In this verification, etching rates of Fe-containing Si were measured while using $CF_4$ as an etching gas. CF based etching gases are widely used in fine etching of materials including MEMS and semiconductor. Si with 5% (atomic percent) Fe, Si with 10% Fe and Si with 15% Fe are deposited on individual pieces of glass substrates and they were etched together.

Figure 13A:
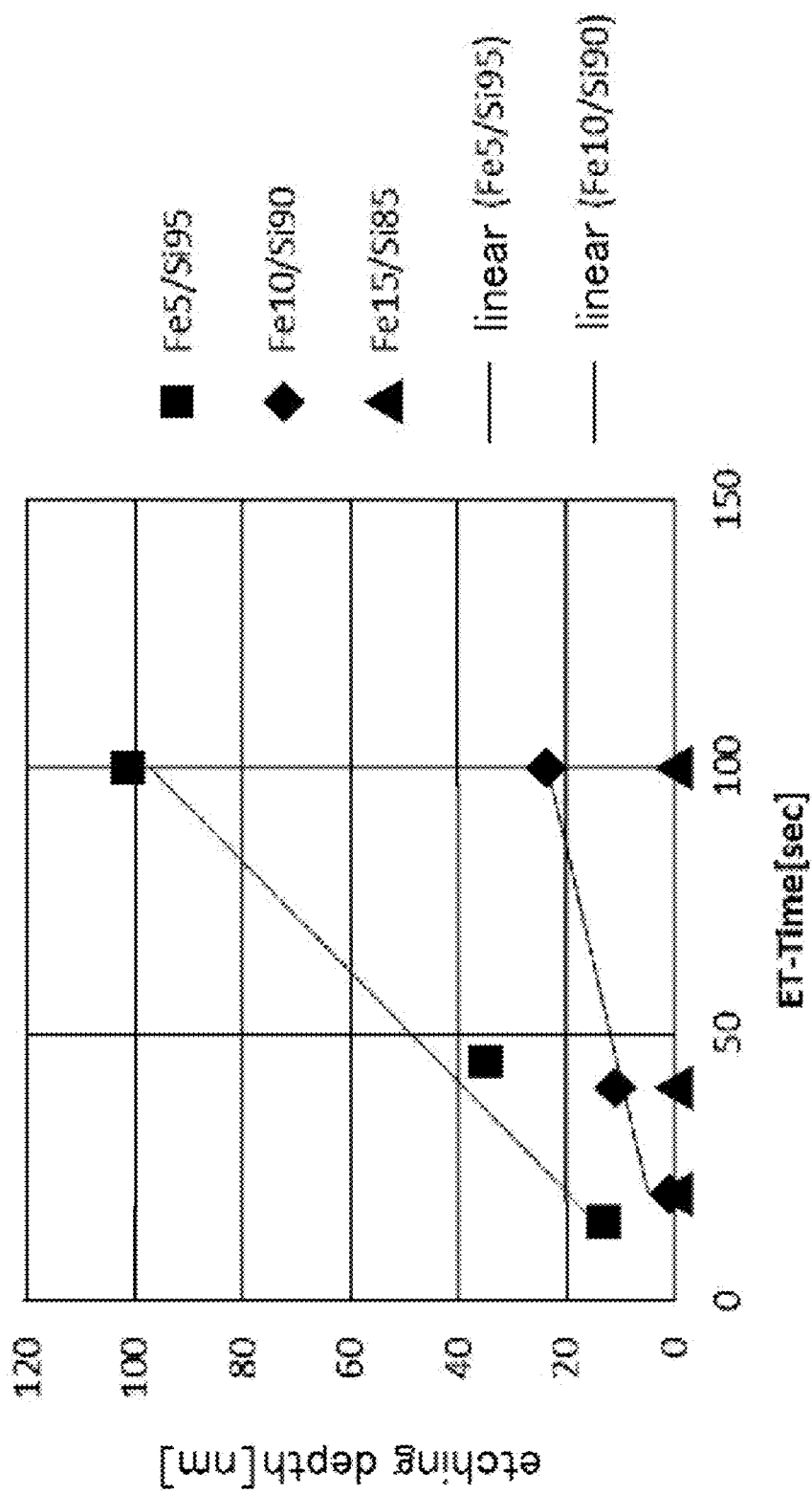

FIG. 13(A) is a graph showing etching depth versus etching time and FIG. 13(B) is a table showing calculation results for etching rates. As shown in FIG. 13(B) the etching rate of the Si with 5% Fe was 0.973 nm/sec, the etching rate of the Si with 10% Fe was 0.234 nm/sec and the Si with 15% Fe was not etched. These results revealed that increasing Fe content decreases etching rate to make the material difficult to be etched.

Although Fe is reported to be able to be etched by using an ammonia gas as an etching gas, for this structure, which is not a single Si layer containing Fe but comprises of layered plural layers, the ammonia gas is not suitable to use because of undesirable affections on other layers (corrosion by etching and etching anisotropy, for example). Existing method using argon gas to physically remove material would cause re-attachment which degrades the property because this structure includes fine pitches.

For the above reasons, it is considered that Fe content more than 50 atomic percent is unpractical even if gaseous species are altered. Consequently, Fe content is preferably 50 atomic percent or less and more practically, 10 atomic percent or less which can be etched by $CF_4$ widely used in semiconductor etching processes. In the case of Fe content of 10 atomic percent or less, it is preferable to provide a Ta layer to improve reflectance reduction effect.

Example 4

Since interference effects among the reflective layer, the dielectric layer and the absorbing layer still exist in the structure using Fe-containing Si as the absorbing layer, the film thickness of the dielectric layer would also affect the reflectance. In Example 4, the reflectance affected by the film thickness of the dielectric layer was evaluated by a simulation based on RCWA method.

Figure 14:
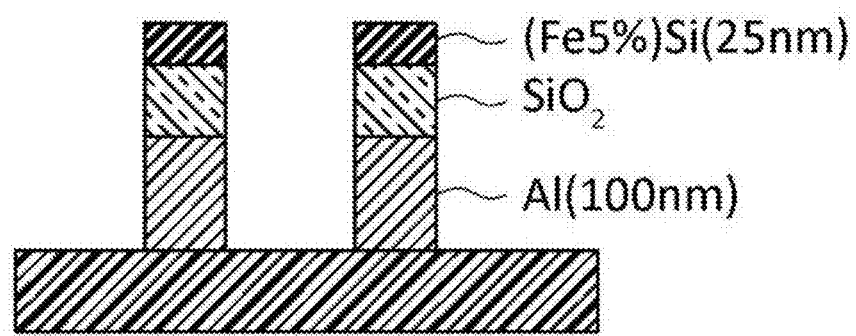
FIG. 14 is a schematic cross sectional view of the polarizing plate used in the simulation of Example 4.
Figure 15:
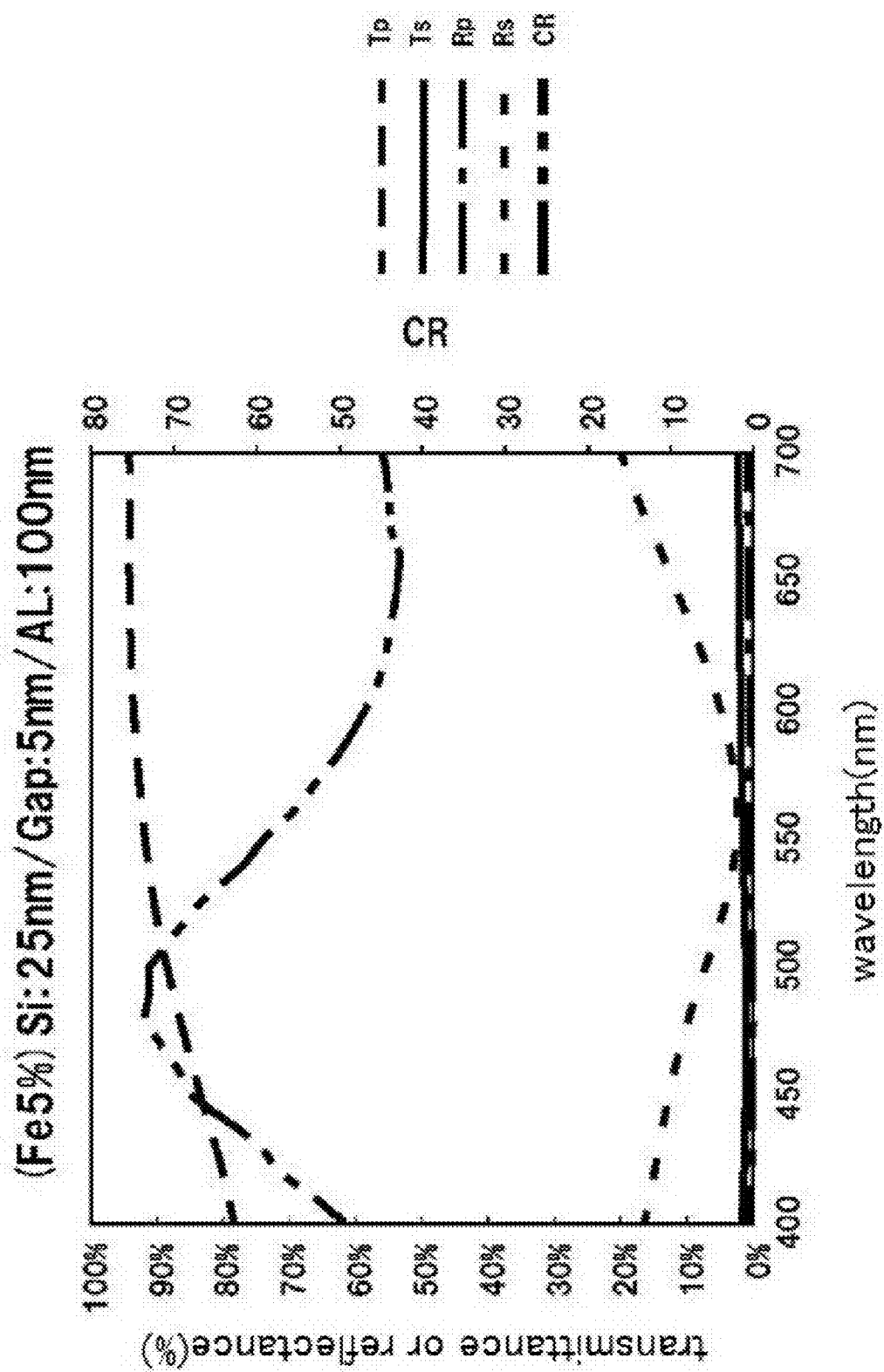
FIG. 15 is a graph showing the optical property with the film thickness of the dielectric layer being 5 nm.
Figure 16:
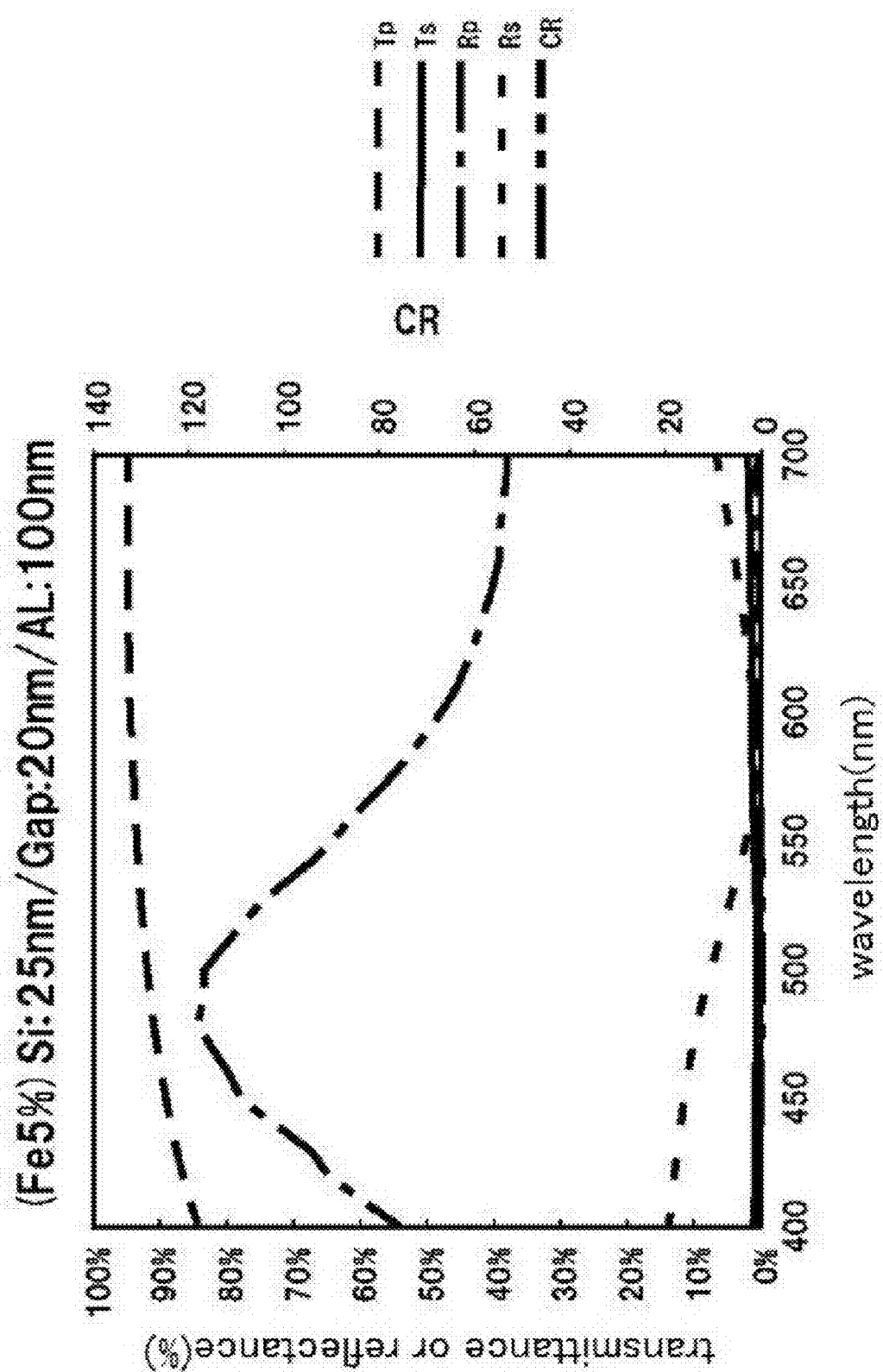
FIG. 16 is a graph showing the optical property with the film thickness of the dielectric layer being 20 nm.
Figure 17:
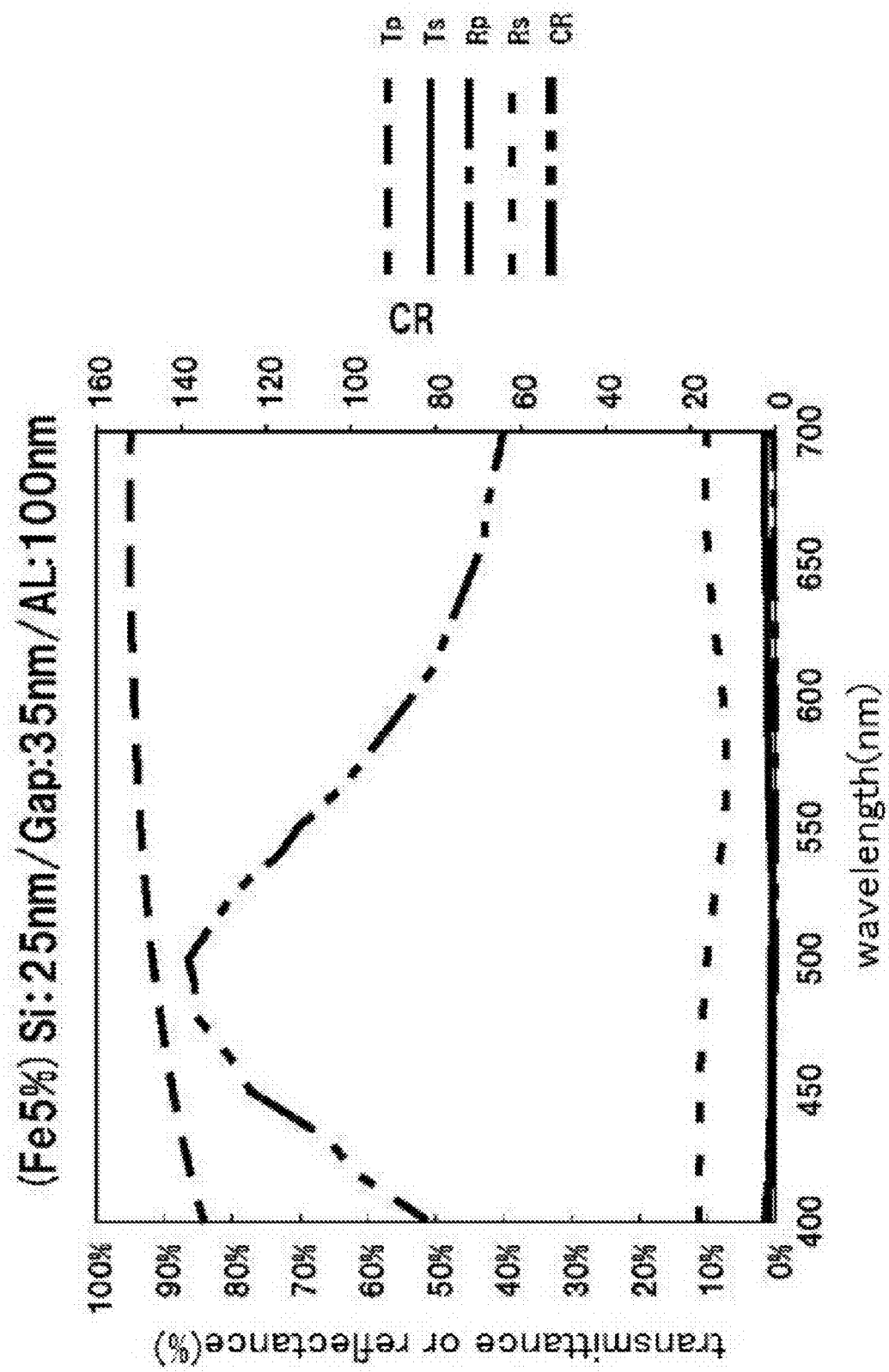
FIG. 17 is a graph showing the optical property with the film thickness of the dielectric layer being 35 nm.
Figure 18:
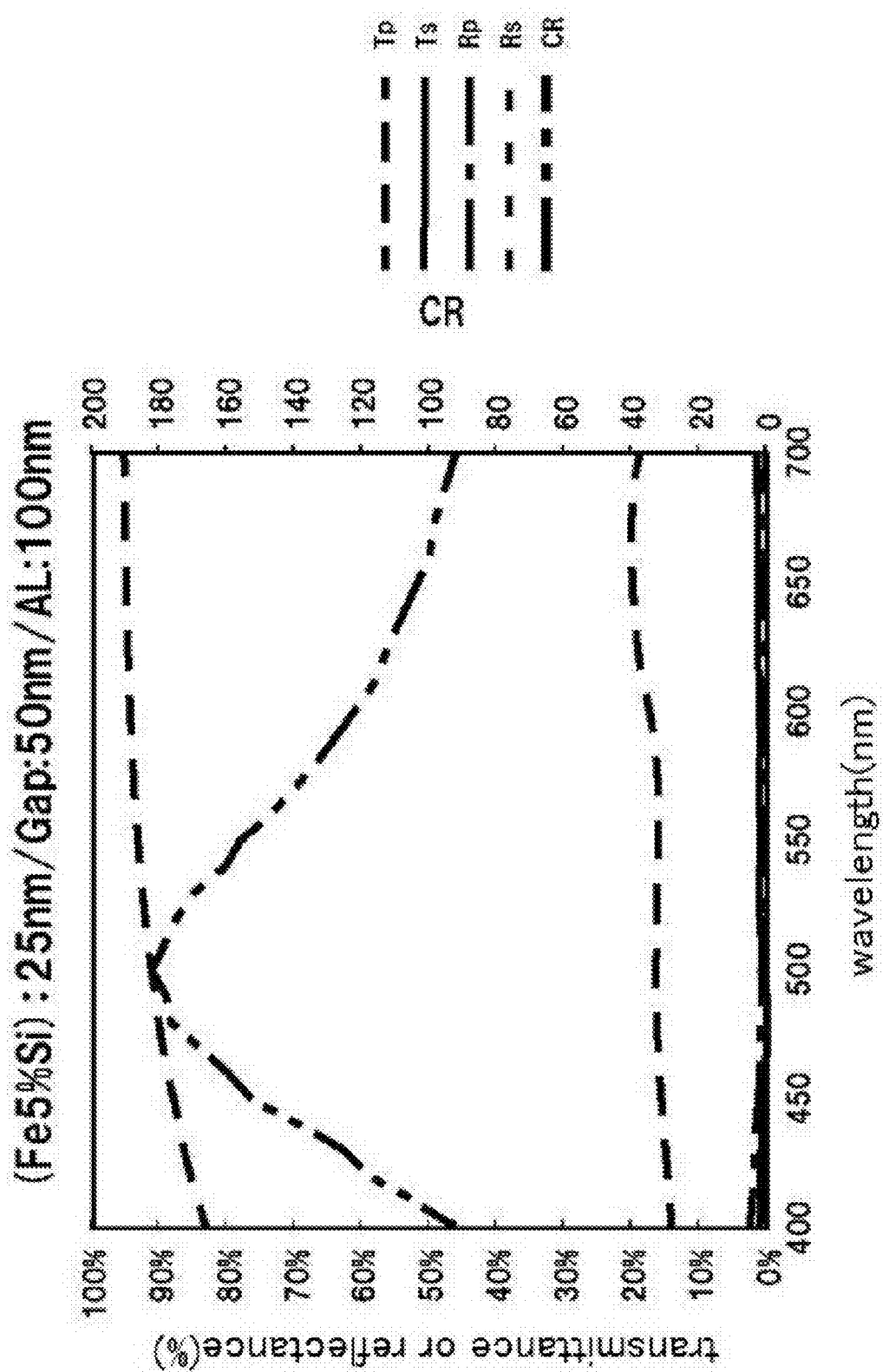
FIG. 18 is a graph showing the optical property with the film thickness of the dielectric layer being 50 nm.

FIG. 14 is a schematic cross sectional view of the polarizing plate used in the simulation of Example 4. The polarizing plate of Example 4, including a grid structure having a pitch of 140 nm, was formed by layering 100 nm of Al, $SiO_2$ and 25 nm of 5 atomic percent of Fe-containing Si on the substrate in this order.

FIGS. 15 to 18 are graphs showing optical properties with the film thickness of the dielectric layers being 5 nm, 20 nm, 35 nm and 50 nm, respectively. As can be seen from FIGS. 15 to 18, the reflectance can be reduced by controlling the film thickness of the dielectric layer. In the cases of 5 nm, 20 nm, 35 nm and 50 nm dielectric layer film thicknesses, the high reflectance can be reduced by layering Ta as explained in Example 1.

In addition, FIGS. 15 to 18 revealed that increasing the dielectric layer film thicknesses will improve absorption and interference effects to increase the contrast (extinction ratio: transmission axis transmittance/absorption axis transmittance).

A thinner dielectric layer film thickness, however, is preferable in order to advantageously reduce etching time in manufacturing process. For example, the polarizing plate used in the simulation shown in FIG. 10, having a dielectric layer film thickness of 50 nm and employing 10 atomic percent of Fe-containing Si, requires long etching time.

Example 5

Next, effects of Ta contents of polarizing plates using Ta-containing Si as absorbing layers are evaluated by producing actual samples.

Figure 19:
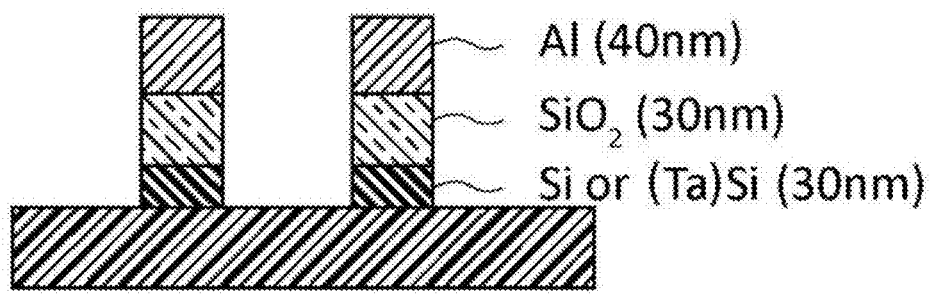
FIG. 19 is a schematic cross sectional view of the polarizing plate of Example 5.
Figure 20:
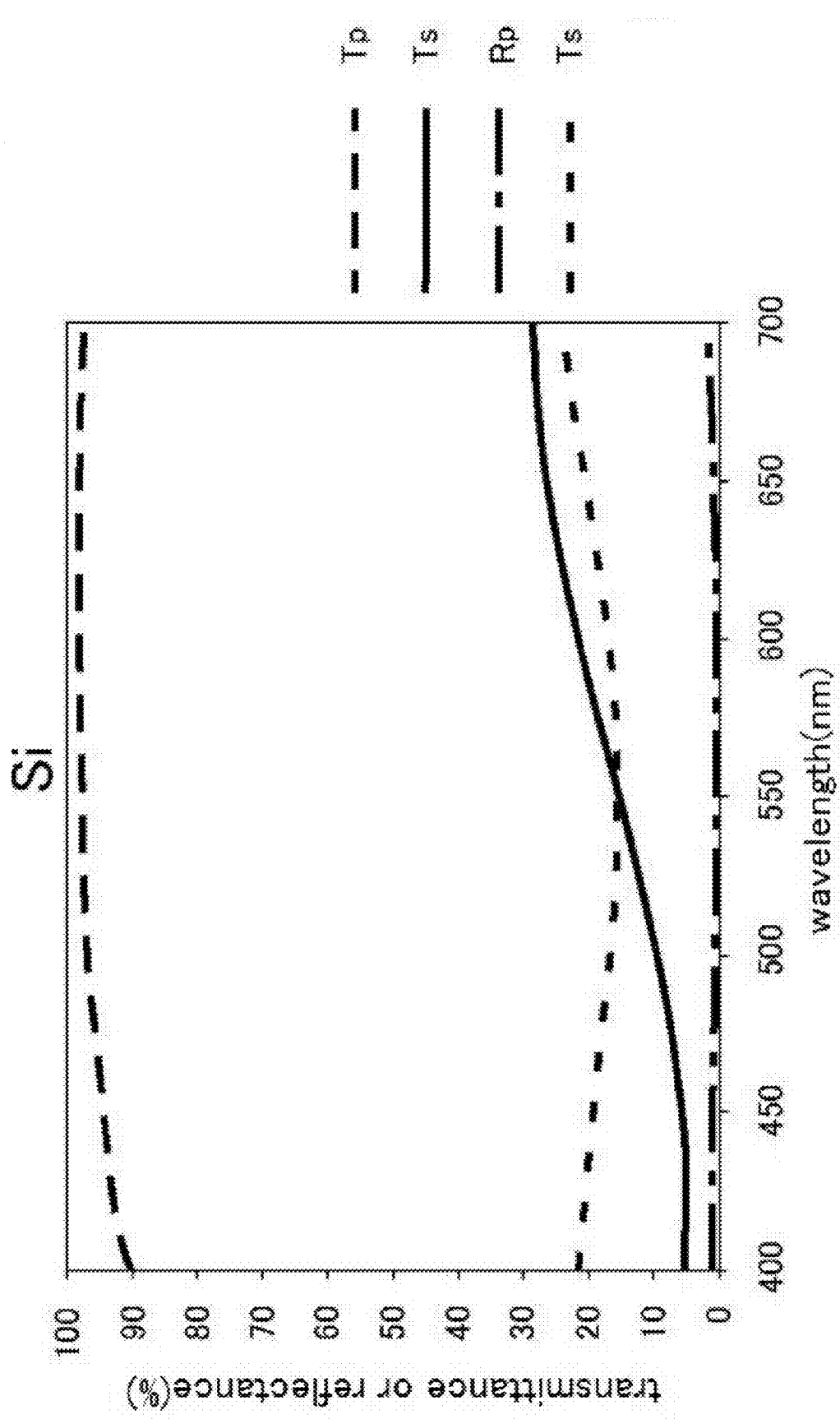
FIG. 20 is a graph showing the optical property of a polarizing plate with absorbing layer being Si.
Figure 21:
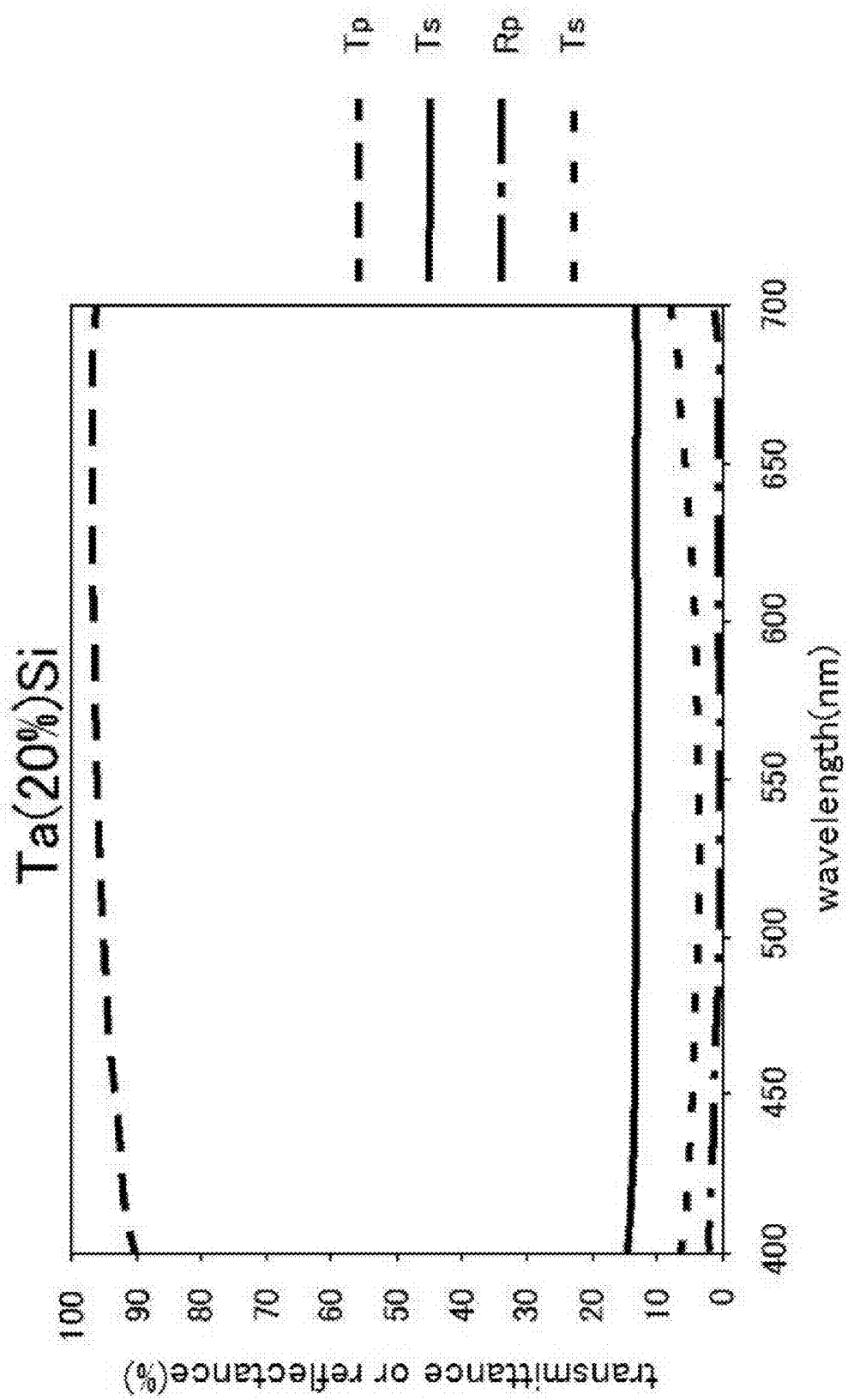
FIG. 21 is a graph showing the optical property of a polarizing plate with an absorbing layer being 20 atomic percent of Ta-containing Si.
Figure 22:
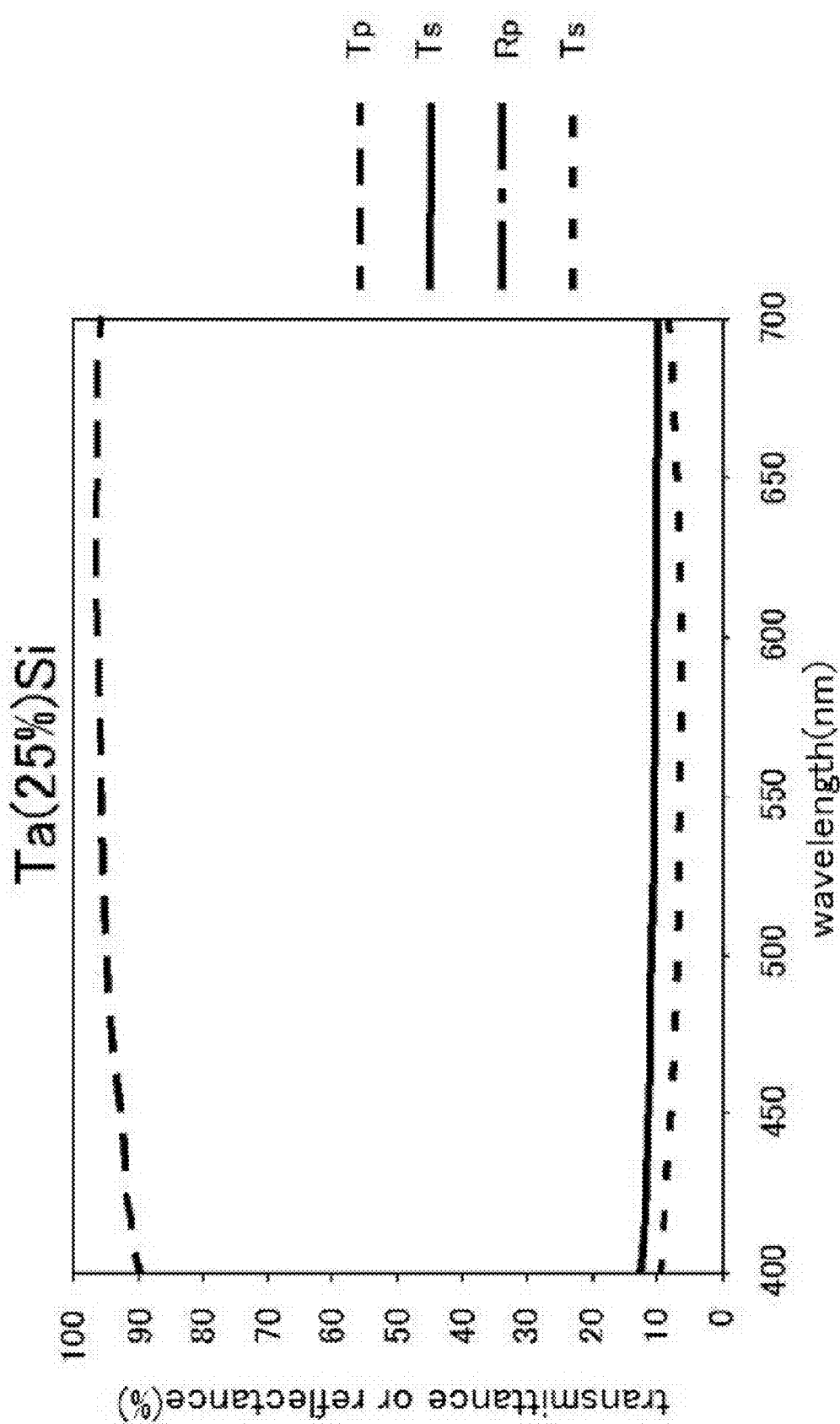
FIG. 22 is a graph showing the optical property of a polarizing plate with an absorbing layer being 25 atomic percent of Ta-containing Si.
Figure 23:
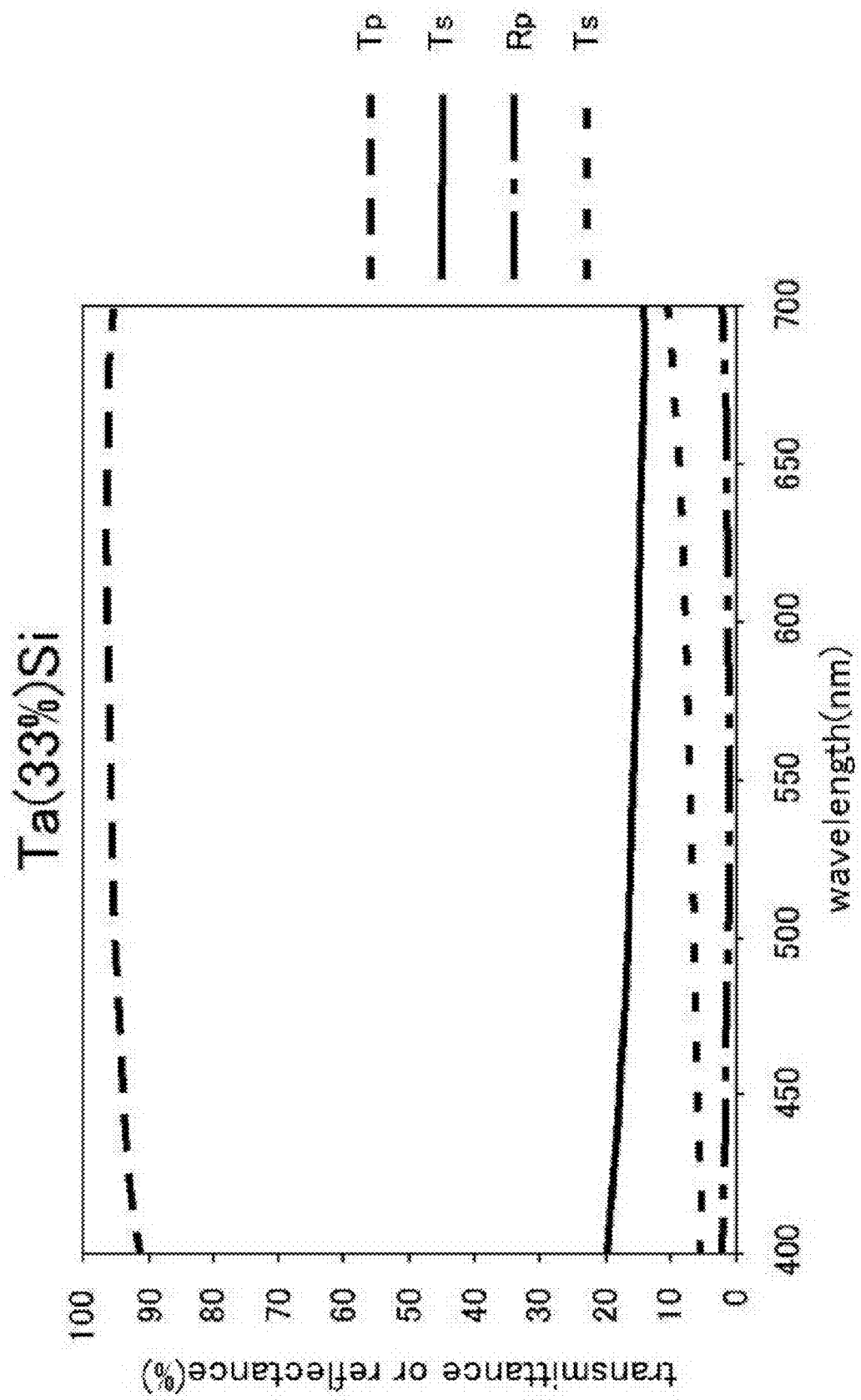
FIG. 23 is a graph showing the optical property of a polarizing plate with an absorbing layer being 33 atomic percent of Ta-containing Si.

FIG. 19 is a schematic cross sectional view of the polarizing plate of Example 5. The polarizing plate of Example 5, including a grid structure having a pitch of 140 nm, was formed by layering 30 nm of absorbing layer, 30 nm of $SiO_2$ and 40 nm of Al on the substrate in this order.

FIGS. 20 to 23 are graphs showing optical properties of polarizing plates with the absorbing layer being Si, 20 atomic percent of Ta-containing Si, 25 atomic percent of Ta-containing Si and 33 atomic percent of Ta-containing Si, respectively.

Figure 24:
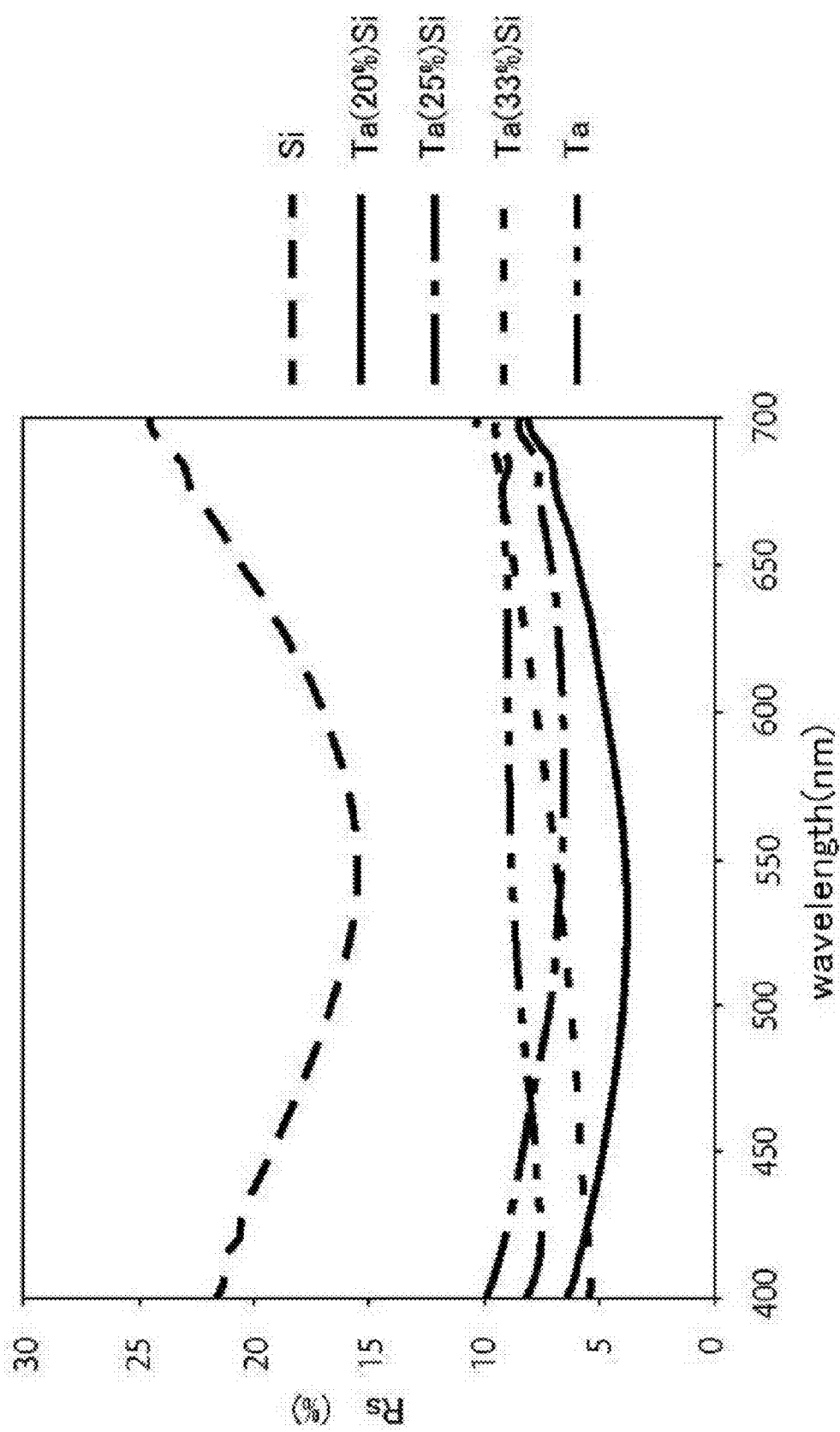
FIG. 24 is a graph showing absorption axis reflectances of polarizing plates with absorbing layers being Si, 20 atomic percent of Ta-containing Si, 25 atomic percent of Ta-containing Si and 33 atomic percent of Ta-containing Si, respectively.
Figure 25:
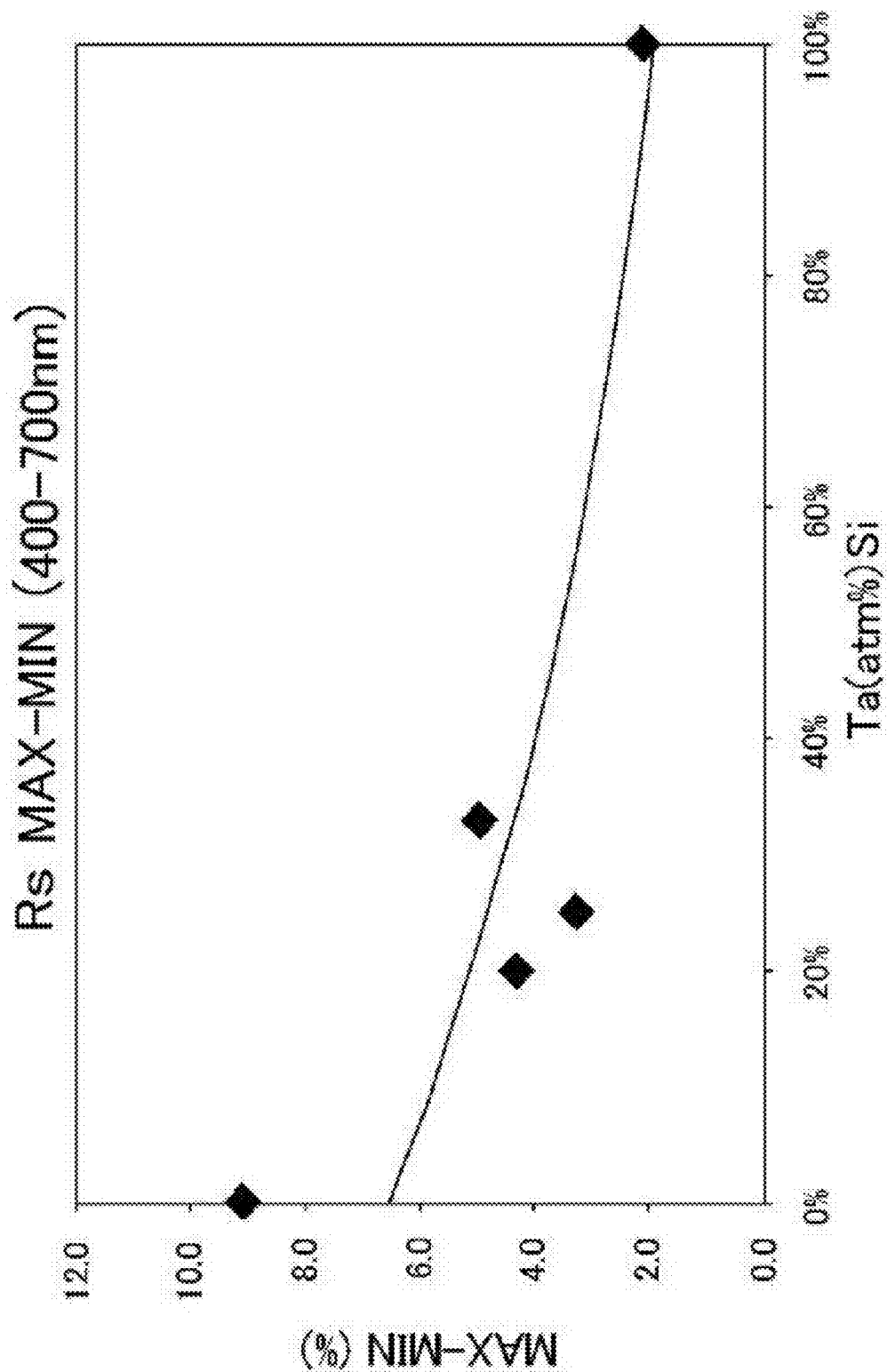
FIG. 25 is a graph showing differences between maximum values and minimum values of absorption axis reflectances relative to atomic percentages of Ta in a measured wavelength range.

FIG. 24 is a graph showing absorption axis reflectances of polarizing plates with absorbing layers being Si, 20 atomic percent of Ta-containing Si, 25 atomic percent of Ta-containing Si and 33 atomic percent of Ta-containing Si, respectively. FIG. 25 is a graph showing differences between maximum values and minimum values of absorption axis reflectances relative to atomic percentages of Ta in a measured wavelength range.

Figure 26:
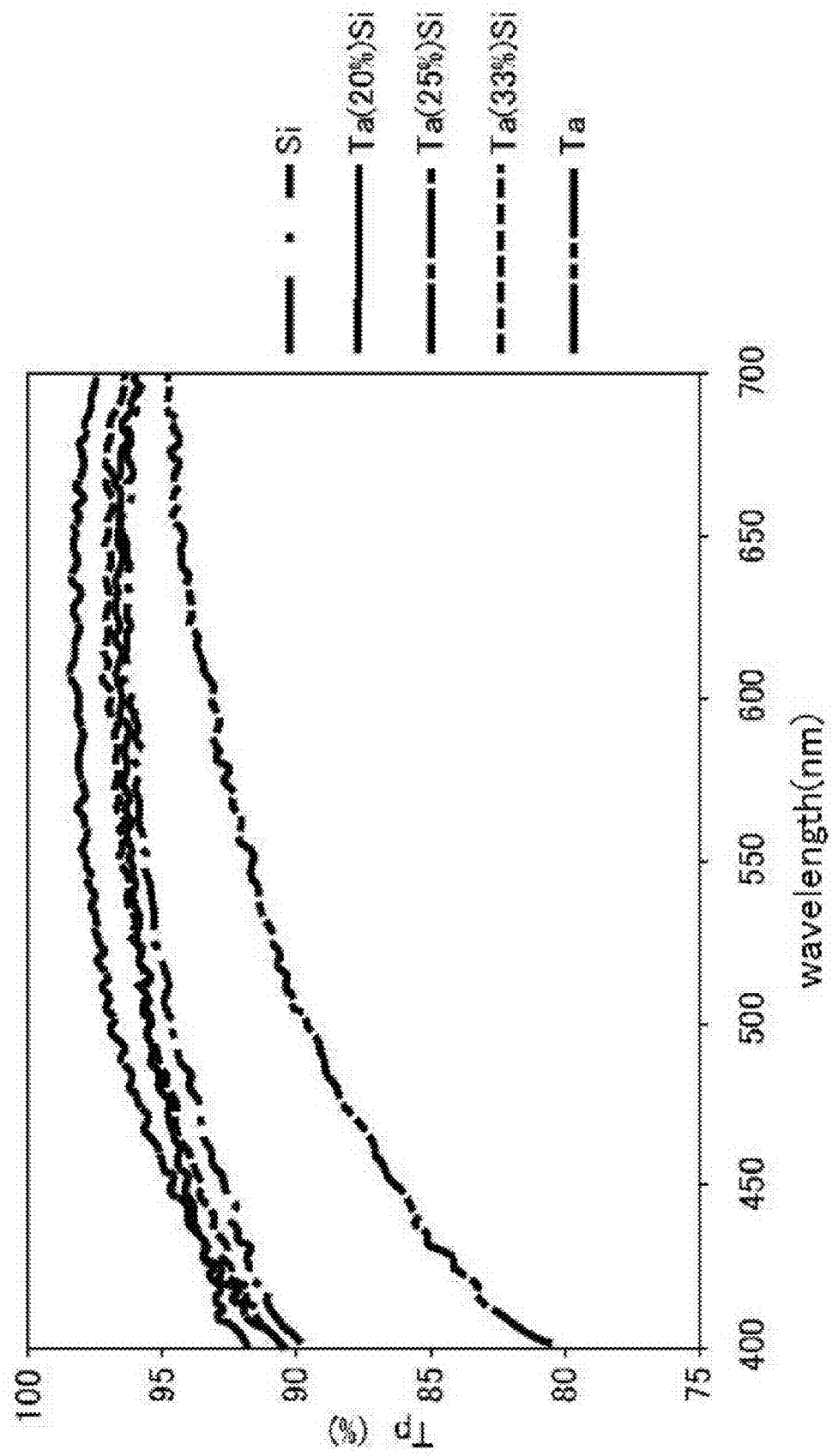
FIG. 26 is a graph showing transmission axis transmittances of polarizing plates with absorbing layers being Si, 20 atomic percent of Ta-containing Si, 25 atomic percent of Ta-containing Si and 33 atomic percent of Ta-containing Si, respectively.
Figure 27:
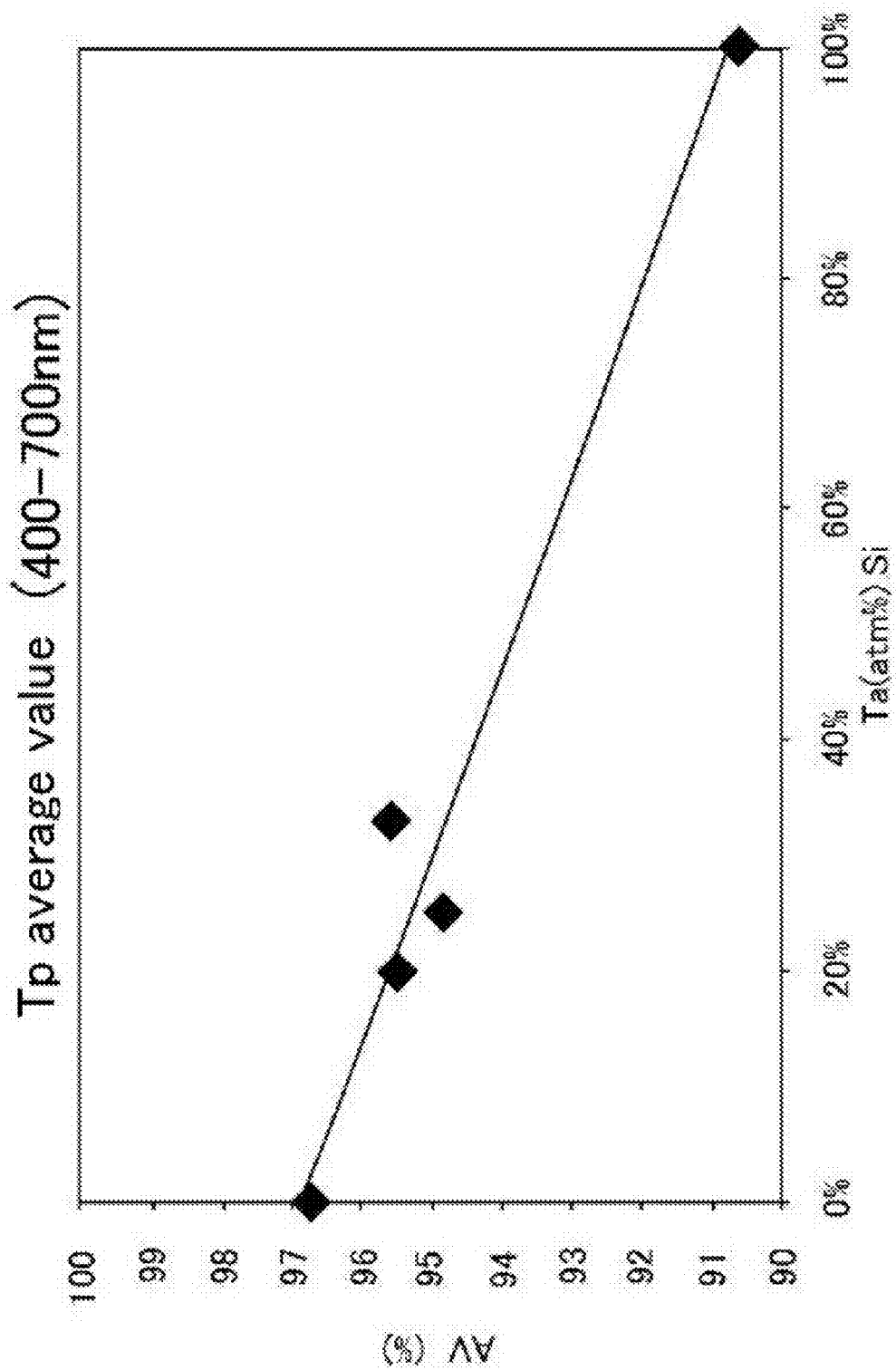
FIG. 27 is a graph showing average values of transmission axis transmittances relative to atomic percentages of Ta in a measured wavelength range.

FIG. 26 is a graph showing transmission axis transmittances of polarizing plates with absorbing layers being Si, 20 atomic percent of Ta-containing Si, 25 atomic percent of Ta-containing Si and 33 atomic percent of Ta-containing Si, respectively. FIG. 27 is a graph showing average values of transmission axis transmittances relative to atomic percentages of Ta in a measured wavelength range.

As shown in FIG. 25, the difference between the maximum value and the minimum values of absorption axis reflectance in the measured wavelength range decreases as the Ta content increases, and a higher Ta content is more preferable as an absorbing type polarizing plate. On the other hand, as shown in FIG. 27, the average value of transmission axis transmittance in the measured wavelength range decreases as the Ta content as the Ta content increases, and hence a lower Ta content is desirable.

FIGS. 25 and 27 reveals that a Ta content of 40 atomic percent or less is preferable. Comparing to a typical float glass having a reflectance of 8%, a Ta content of less than 40 atomic percent will result in a reflectance equal to or less than that of the glass and a high transmittance. In other words, it can keep a reduced reflectance and a high transmittance in practice.

It should be noted that, although the structure of the first polarizing plate shown in FIG. 1 was used in Example 4, the same effect can also be obtained by using the structure of the second polarizing plate shown in FIG. 2.

Example 6

The reflectance affected by the film thickness of the dielectric layer was explained by Example 4. In Example 6, the wavelength that minimizes the reflectance affected by the film thickness of the dielectric layer was evaluated by producing actual samples.

Figure 28:
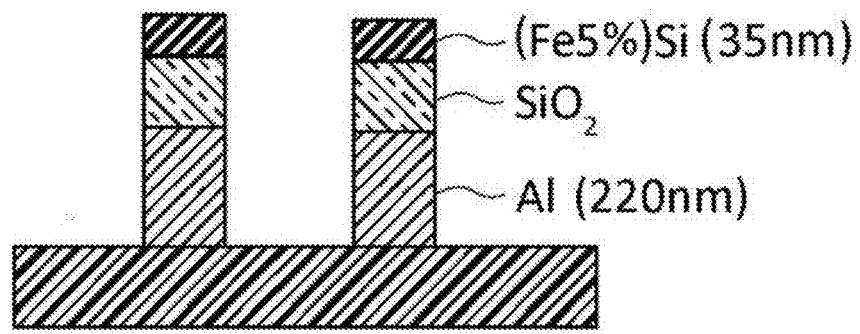
FIG. 28 is a schematic cross sectional view of the polarizing plate of Example 6.

FIG. 28 is a schematic cross sectional view of the polarizing plate of Example 6. The polarizing plate of Example 6, including a grid structure having a pitch of 140 nm, was formed by layering 220 nm of Al, $SiO_2$ and 35 nm of 5 atomic percent of Fe-containing Si on the substrate in this order.

Figure 29:
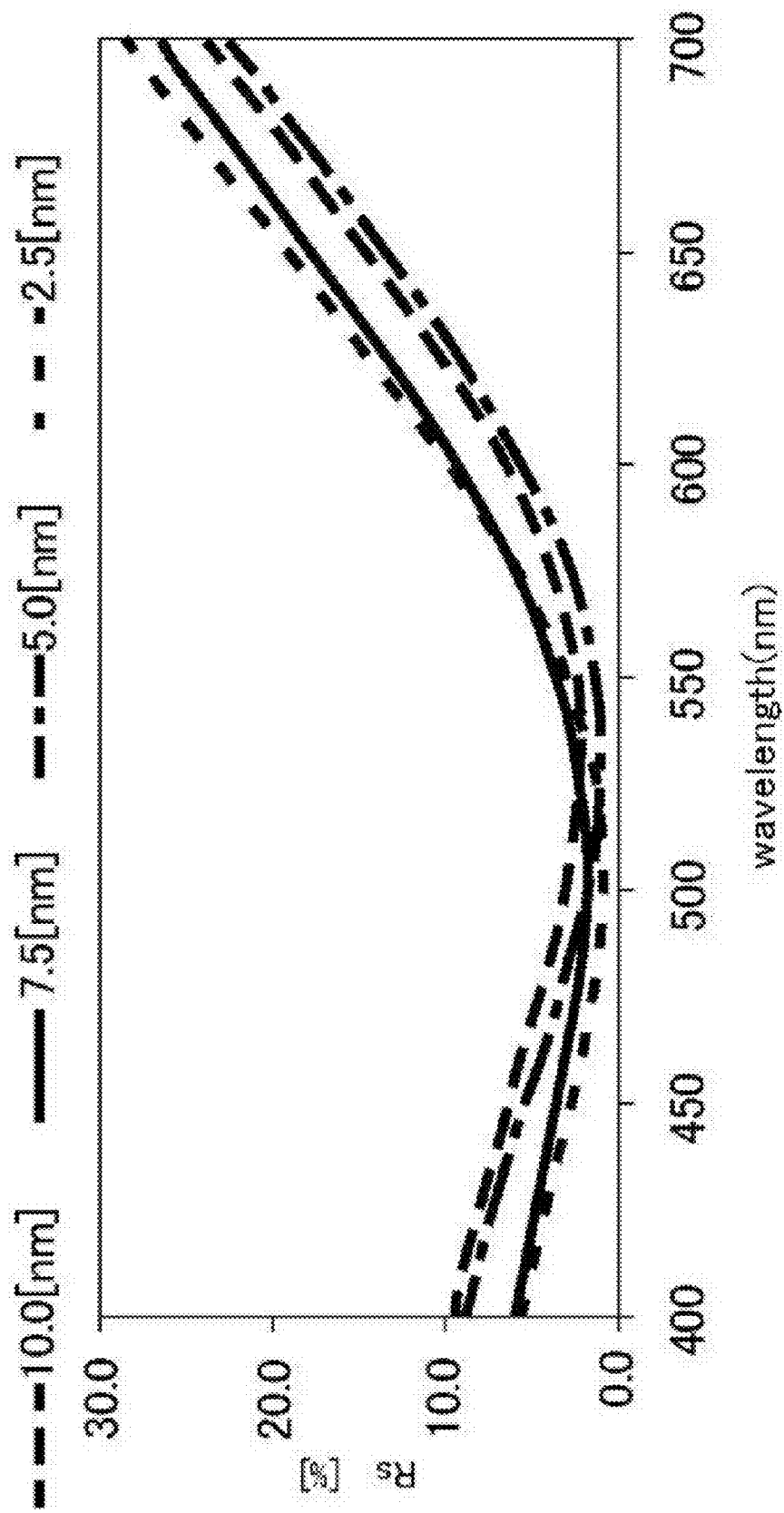
FIG. 29 is a graph showing absorption axis reflectances of polarizing plates with the film thickness of the dielectric layers being 2.5 nm, 5.0 nm, 7.5 nm and 10.0 nm.

FIG. 29 is a graph showing absorption axis reflectances of polarizing plates with the film thickness of the dielectric layers being 2.5 nm, 5.0 nm, 7.5 nm and 10.0 nm. As can be seen from FIG. 29, the wavelength minimizing the absorption axis reflectance can be controlled by the film thickness of the dielectric layer. In addition, since the reflectance was reduced even if the dielectric layer film thickness was as thin as 2.5 nm, the dielectric layer can be omitted depending on the wavelength at which a low reflectance is desired.

Figure 30:
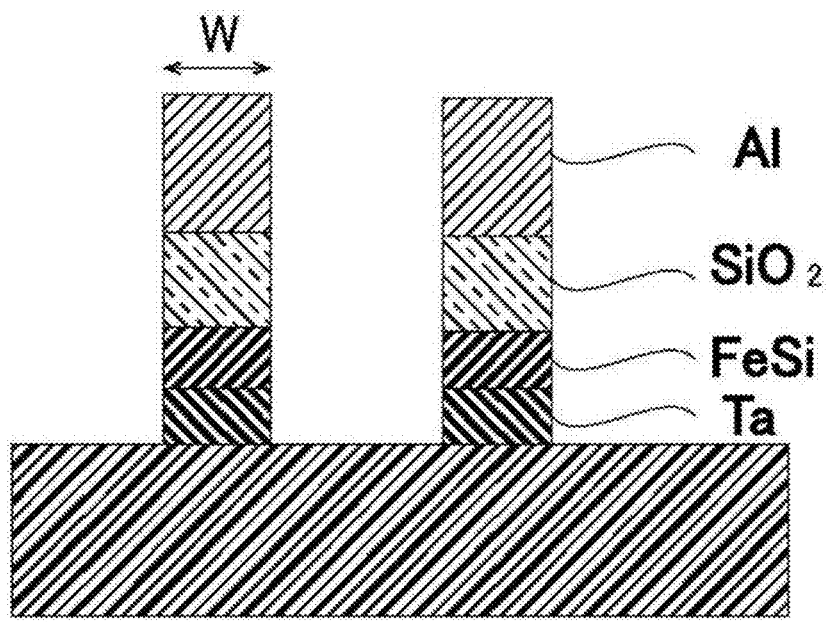
FIG. 30 is a schematic cross sectional view of the polarizing plate of Example 7.
Figure 31:
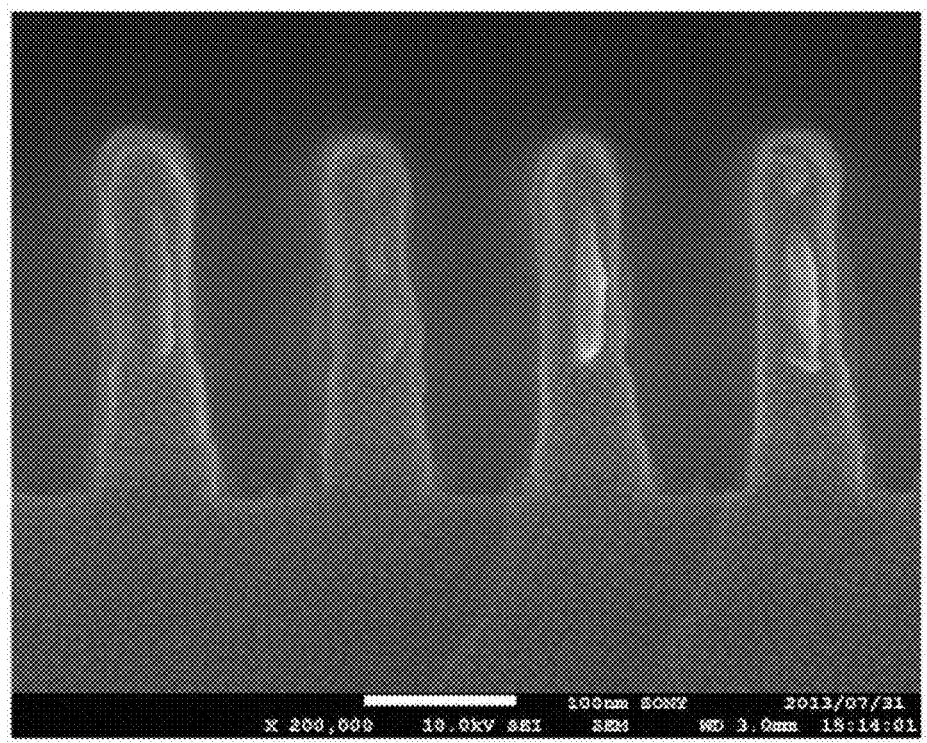
FIG. 31 is an SEM image of a cross-section of the polarizing plate of Example 7.

FIG. 30 is a schematic cross sectional view of the polarizing plate of Example 7 and FIG. 31 is an SEM image of a cross-section of the polarizing plate of Example 7. The polarizing plate of Example 7 was produced as follows. Firstly, we prepared a transparent substrate having a thickness of 0.7 mm (model name: Eagle 2000 manufactured by Corning incorporated). Then, 15 nm of $SiO_2$ as a backing film, 15 nm of Ta as an absorbing layer A, 10 nm of Si with 5% Fe as an absorbing layer B, 40 nm of SiOx as a dielectric layer and 170 nm of Al as a reflective layer were sequentially deposited on the transparent substrate by spattering method. The Si with 5% Fe was deposited by using a silicon target containing 5 atomic percent of Fe.

Next, an anti-reflecting coating (BARC) was deposited on the reflective layer and a grid-shaped mask pattern was formed by a resist. Next, the BARC was removed by scumming process with $Ar/O_2$ gas, and Al was etched with $Cl_2/BCl_3$. Subsequently, a corrosion layer (chloride compound) was removed by $H_2O$ plasma and the resist and the BARV were removed by $O_2$ ashing. Finally, the reflective layer was etched with $CF_4/Ar$ gas to form grid-shaped convexities, thereby completing the polarizing plate including a grid structure having a pitch of 140 nm. The etching conditions for the absorbing layer were 20 sccm of $CF_4$ gas flow rate, 4 sccm of Ar gas flow rate, 0.5 Pa of $CF_4/Ar$ gas pressure, 400 Pa of cooling He gas pressure and 80 sec of etching time. The width of Ta layer in the polarizing plate of Example 7 was almost same as the width W of the Al layer.

Figure 32A:
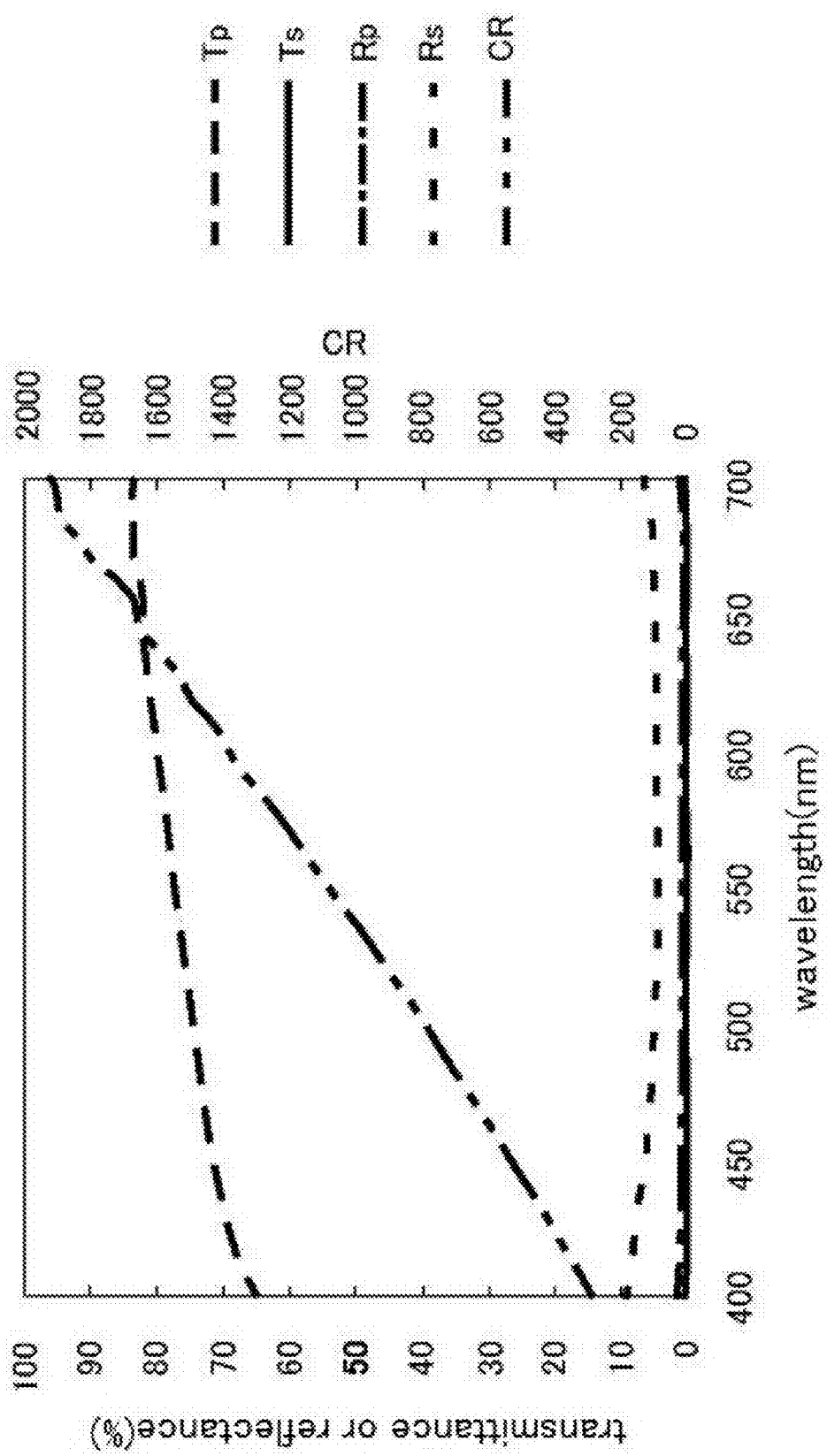

FIG. 32(A) is a graph showing the optical property of the polarizing plate of Example 7 and FIG. 32(B) is a table showing average values of transmission axis transmittance Tp, absorption axis transmittance Ts, contrast CR (Tp/Ts), transmission axis reflectance Rp and absorption axis reflectance Rs in respective wavelength ranges of red (R), green (G) and blue (B). Similarly to Example 1, the polarizing plate of Example 7 could reduce the reflectance in a wide visible wavelength range as compared with the comparative example. In addition, the polarizing plate of Example 7 could achieve a high contrast CR.

Figure 33:
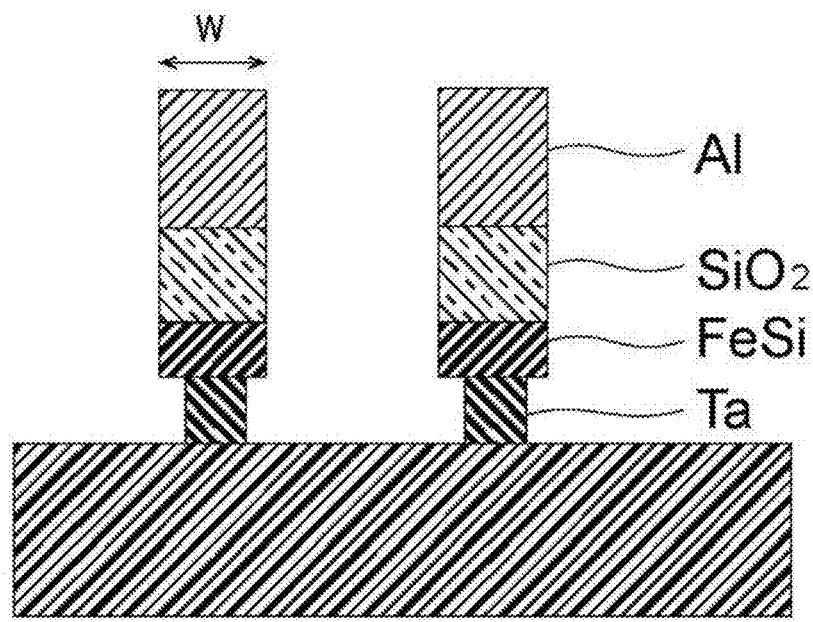
FIG. 33 is a schematic cross sectional view of the polarizing plate of Example 8.
Figure 34:
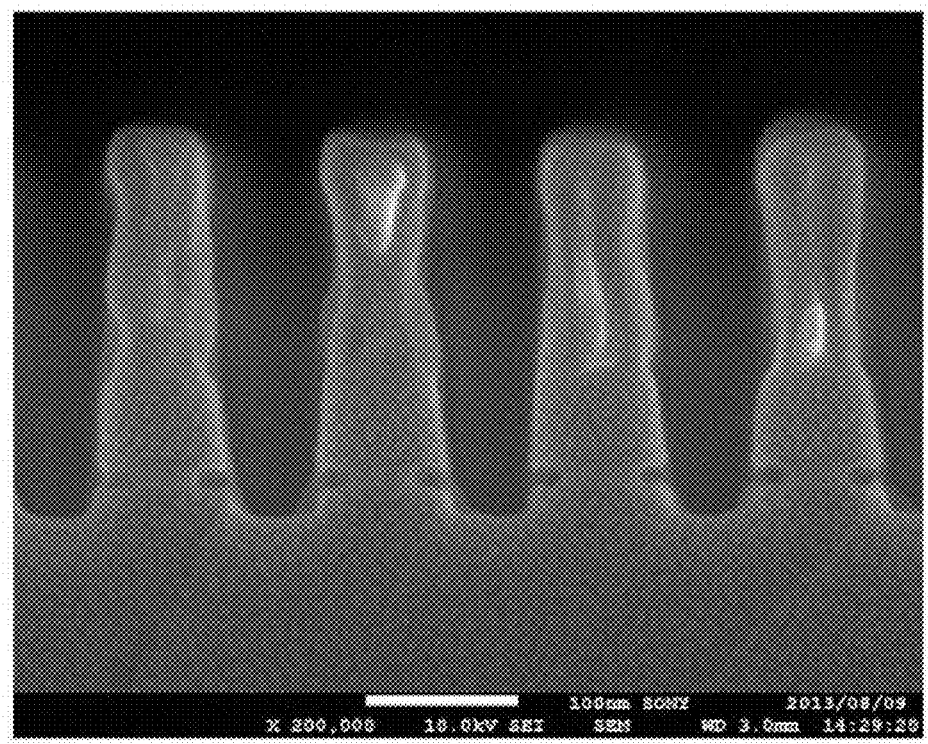
FIG. 34 is an SEM image of a cross-section of the polarizing plate of Example 8.

FIG. 33 is a schematic cross sectional view of the polarizing plate of Example 8 and FIG. 34 is an SEM image of a cross-section of the polarizing plate of Example 8. The polarizing plate of Example 8 was produced similarly to the polarizing plate of Example 7 except for etching conditions. The etching conditions for the absorbing layer were 20 sccm of $CF_4$ gas flow rate, 4 sccm of Ar gas flow rate, 2.0 Pa of $CF_4/Ar$ gas pressure, 1.000 Pa of cooling He gas pressure and 80 sec of etching time. The width of Ta layer in the polarizing plate of Example 8 was formed to be narrower than the width W of the Al layer.

Figure 35A:
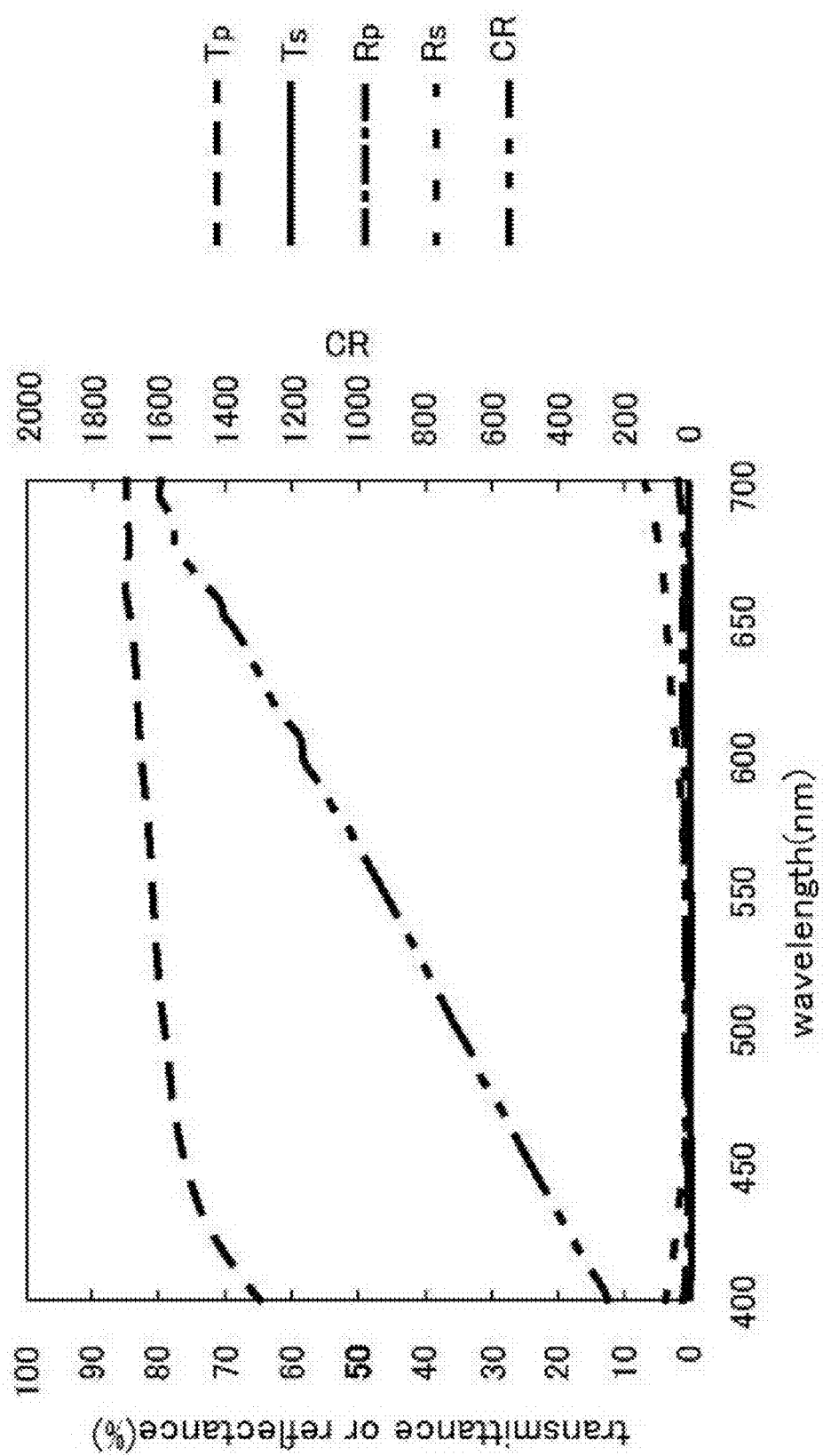

FIG. 35(A) is a graph showing the optical property of the polarizing plate of Example 8 and FIG. 35(B) is a table showing average values of transmission axis transmittance Tp, absorption axis transmittance Ts, contrast CR (Tp/Ts), transmission axis reflectance Rp and absorption axis reflectance Rs in respective wavelength ranges of red (R), green (G) and blue (B). The polarizing plate of Example 8 could achieve a reduced reflectance lower than that of Example 7 while maintaining the contrast CR as high as that of Example 7. This was particularly prominent in the blue wavelength range (430 nm to 510 nm).

REFERENCE SIGNS LIST

11 transparent substrate, 12 absorbing layer, 13 dielectric layer, 14 reflective layer

What is claimed is:

1. A method of manufacturing a polarizing plate comprising steps of:
   preparing a transparent substrate transmitting light in a used bandwidth;
   layering an absorbing layer having at least a metal-containing semiconductor layer, and a reflective layer in this order; and
   forming a one-dimensional lattice shaped wire-grid structure having a pitch smaller than a wavelength of the light in the used bandwidth by etching.

2. The method of manufacturing a polarizing plate according to claim 1, wherein in the step of layering, a dielectric layer is formed between the absorbing layer and the reflective layer.

3. The method of manufacturing a polarizing plate according to claim 1, wherein
   a semiconductor of the metal-containing semiconductor is selected from the group consisting of Si, Ge, Te and ZnO,
   the metal contained in the metal-containing semiconductor is a pure metal selected from the group consisting of Ta, Al, Ag, Cu, Au, Mo, Cr, Ti, W, Ni, Fe, Sn and Nb or an alloy of any of those metals, and
   a metal content of the metal-containing semiconductor is equal to or less than 50 atomic percent.

4. The method of manufacturing a polarizing plate according to claim 2, wherein a width of at least a portion of the absorbing layer or the dielectric layer is narrower than a width of the reflective layer.

5. The method of manufacturing a polarizing plate according to claim 4, wherein in the step of layering, the absorbing layer includes a metal layer having a width narrower than the width of the reflective layer.

6. The method of manufacturing a polarizing plate according to claim 5, wherein the absorbing layer is formed in the order of the metal layer and the metal-containing semiconductor layer in a light incident direction.

7. The method of manufacturing a polarizing plate according to claim 5, wherein the metal layer is a Ta layer.

8. The method of manufacturing a polarizing plate according to claim 5, wherein the metal contained in the metal-containing semiconductor layer is Fe.

9. The method of manufacturing a polarizing plate according to claim 1, wherein in the step of layering, the absorbing layer further includes a metal layer or a semiconductor layer.

10. The method of manufacturing a polarizing plate according to claim 1, wherein a semiconductor of the metal-containing semiconductor layer is Si.

11. The method of manufacturing a polarizing plate according to claim 10, wherein the metal contained in the metal-containing semiconductor layer is Fe.

12. The method of manufacturing a polarizing plate according to claim 11, wherein a metal content of the metal-containing semiconductor is equal to or less than 50 atomic percent.

13. The method of manufacturing a polarizing plate according to claim 11, wherein the absorbing layer further includes a Ta layer.

14. The method of manufacturing a polarizing plate according to claim 13, wherein the absorbing layer is formed in the order of the Ta layer and the metal-containing semiconductor layer in a light incident direction.

15. The method of manufacturing a polarizing plate according to claim 14, wherein a film thickness of the metal-containing semiconductor layer is thicker than that of the Ta layer.

16. The method of manufacturing a polarizing plate according to claim 9, wherein the metal contained in the metal-containing semiconductor layer is Ta.

17. The method of manufacturing a polarizing plate according to claim 16, wherein a Ta content of the metal-containing semiconductor is equal to or less than 40 atomic percent.

18. The method of manufacturing a polarizing plate according to claim 16, wherein the absorbing layer further includes a Ta layer.

19. The method of manufacturing a polarizing plate according to claim 18, wherein the absorbing layer is formed in the order of the Ta layer and the metal-containing semiconductor layer in a light incident direction.

20. The method of manufacturing a polarizing plate according to claim 19, wherein a film thickness of the metal-containing semiconductor layer is thicker than that of the Ta layer.

* * * * *